United States Patent
Bonner et al.

(10) Patent No.: US 7,734,513 B2
(45) Date of Patent: Jun. 8, 2010

(54) SYSTEM OF TRACKING THE REAL TIME LOCATION OF SHOPPERS, ASSOCIATES, MANAGERS AND VENDORS THROUGH A COMMUNICATION MULTI-NETWORK WITHIN A STORE

(75) Inventors: Brett Bracewell Bonner, New Richmond, OH (US); Christopher Todd Hjelm, Cincinnati, OH (US); Titus Arthur Jones, Hebron, KY (US); John Edward Osborne, II, Indian Springs, OH (US); Dion Brent Perkins, Cincinnati, OH (US)

(73) Assignee: Sunrise R&D Holdings, LLC, Cincinnati, OH (US)

( * ) Notice: Subject to any disclaimer, the term of this patent is extended or adjusted under 35 U.S.C. 154(b) by 0 days.

(21) Appl. No.: 12/353,817

(22) Filed: Jan. 14, 2009

(65) Prior Publication Data

US 2009/0179753 A1 Jul. 16, 2009

Related U.S. Application Data

(63) Continuation-in-part of application No. 12/172,326, filed on Jul. 14, 2008, and a continuation-in-part of application No. 12/058,705, filed on Mar. 29, 2008.

(60) Provisional application No. 61/065,166, filed on Feb. 8, 2008, provisional application No. 61/011,125, filed on Jan. 15, 2008, provisional application No. 61/069,076, filed on Mar. 12, 2008, provisional application No. 61/070,344, filed on Mar. 21, 2008, provisional application No. 61/046,820, filed on Apr. 22, 2008, provisional application No. 61/110,202, filed on Oct. 31, 2008.

(51) Int. Cl.
*G06Q 30/00* (2006.01)
*H04L 12/56* (2006.01)
(52) U.S. Cl. .......................................... 705/26; 370/406
(58) Field of Classification Search .................. 705/26, 705/27; 370/406
See application file for complete search history.

(56) References Cited

U.S. PATENT DOCUMENTS 4,929,819 A 5/1990 Collins, Jr.

(Continued)

FOREIGN PATENT DOCUMENTS

CN 1953408 A 4/2007

(Continued)

OTHER PUBLICATIONS

Repas, Robert, "Industrial Sensing the Wireless Way," Jan. 6, 2005, Machine Design, v77n1, pp. 104, 106, 108, 110.*

(Continued)

*Primary Examiner*—Jeffrey A. Smith
*Assistant Examiner*—Brandy Zukanovich
(74) *Attorney, Agent, or Firm*—Theodore P. Cummings, Esq.

(57) ABSTRACT

The invention relates to one or more systems for locating a shopper's, associate's, manager's or vendor's presumed position in a store using a communication multi-network for communication in the store. Specifically, at least one location device is positioned in proximity to, for example, a shopper such that the shopper's presumed position about the store may be known continuously or upon demand to the store.

18 Claims, 16 Drawing Sheets

U.S. PATENT DOCUMENTS

| | | |
|---|---|---|
| 5,294,781 A | 3/1994 | Takahashi et al. |
| 5,434,775 A | 7/1995 | Sims et al. |
| 5,630,071 A | 5/1997 | Sakai et al. |
| 5,825,002 A | 10/1998 | Roslak |
| 5,918,211 A | 6/1999 | Sloane |
| 5,995,015 A | 11/1999 | DeTemple et al. |
| 6,032,127 A | 2/2000 | Schkolnick et al. |
| 6,119,935 A | 9/2000 | Jelen et al. |
| 6,236,335 B1 | 5/2001 | Goodwin, III |
| 6,347,079 B1 | 2/2002 | Stephens et al. |
| 6,382,357 B1 | 5/2002 | Morrison et al. |
| 6,522,641 B1 | 2/2003 | Siu et al. |
| 6,587,835 B1 | 7/2003 | Treyz et al. |
| 6,659,344 B2 | 12/2003 | Otto et al. |
| 6,725,206 B1 | 4/2004 | Coveley |
| 6,820,062 B1 | 11/2004 | Gupta et al. |
| 6,837,436 B2 | 1/2005 | Swartz et al. |
| 6,879,574 B2 | 4/2005 | Naghian et al. |
| 6,895,330 B2 | 5/2005 | Cato et al. |
| 6,959,862 B2 | 11/2005 | Neumark |
| 7,006,982 B2 | 2/2006 | Sorensen |
| 7,076,441 B2 | 7/2006 | Hind et al. |
| 7,084,765 B2 | 8/2006 | Clapper |
| 7,089,020 B2 | 8/2006 | Asthana et al. |
| 7,167,799 B1 * | 1/2007 | Dolgov et al. ............... 701/301 |
| 7,209,754 B2 | 4/2007 | Niu et al. |
| 7,240,834 B2 | 7/2007 | Kato et al. |
| 7,245,214 B2 | 7/2007 | Smith |
| 7,263,378 B2 | 8/2007 | Inselberg |
| 7,283,048 B2 | 10/2007 | Stilp |
| 7,301,455 B2 | 11/2007 | McKenna et al. |
| 7,309,009 B2 | 12/2007 | Singer-Harter |
| 7,343,317 B2 | 3/2008 | Jokinen et al. |
| 7,390,264 B2 | 6/2008 | Walker et al. |
| 7,416,123 B2 | 8/2008 | Saperstein et al. |
| 7,420,464 B2 | 9/2008 | Fitzgerald et al. |
| 7,443,295 B2 | 10/2008 | Brice et al. |
| 7,463,143 B2 | 12/2008 | Forr et al. |
| 7,475,813 B2 | 1/2009 | Swanson, Sr. |
| 7,503,477 B2 | 3/2009 | Johnson |
| 7,504,937 B2 | 3/2009 | McKenna et al. |
| 2001/0028301 A1 | 10/2001 | Geiger et al. |
| 2002/0002504 A1 | 1/2002 | Engel et al. |
| 2002/0161658 A1 | 10/2002 | Sussman |
| 2002/0174025 A1 | 11/2002 | Hind et al. |
| 2003/0171944 A1 | 9/2003 | Fine et al. |
| 2003/0217137 A1 | 11/2003 | Roese et al. |
| 2004/0029558 A1 | 2/2004 | Liu |
| 2004/0111454 A1 * | 6/2004 | Sorensen ................... 708/200 |
| 2004/0235468 A1 | 11/2004 | Luebke et al. |
| 2005/0021704 A1 | 1/2005 | Larson et al. |
| 2005/0080894 A1 | 4/2005 | Apostolopoulos et al. |
| 2005/0136944 A1 | 6/2005 | Misikangas et al. |
| 2005/0216339 A1 | 9/2005 | Brazell et al. |
| 2005/0246196 A1 | 11/2005 | Frantz et al. |
| 2005/0256782 A1 | 11/2005 | Sands et al. |
| 2006/0009152 A1 * | 1/2006 | Millard et al. ............. 455/12.1 |
| 2006/0125356 A1 | 6/2006 | Meek, Jr. et al. |
| 2006/0149628 A1 | 7/2006 | Chefalas et al. |
| 2006/0181458 A1 | 8/2006 | Niu et al. |
| 2006/0186973 A1 | 8/2006 | Satou |
| 2006/0193262 A1 * | 8/2006 | McSheffrey et al. ........ 370/241 |
| 2006/0200378 A1 * | 9/2006 | Sorensen ..................... 705/10 |
| 2006/0244588 A1 | 11/2006 | Hannah et al. |
| 2006/0266825 A1 | 11/2006 | Do et al. |
| 2006/0282334 A1 | 12/2006 | Kao et al. |
| 2006/0289637 A1 | 12/2006 | Brice et al. |
| 2006/0293779 A1 | 12/2006 | Nishri |
| 2006/0293968 A1 | 12/2006 | Brice et al. |
| 2007/0027612 A1 | 2/2007 | Barfoot et al. |
| 2007/0055563 A1 | 3/2007 | Godsey et al. |
| 2007/0061041 A1 | 3/2007 | Zweig |
| 2007/0063837 A1 | 3/2007 | McKenna et al. |
| 2007/0073554 A1 | 3/2007 | Flinn et al. |
| 2007/0094080 A1 | 4/2007 | Wiken |
| 2007/0106775 A1 | 5/2007 | Wong |
| 2007/0118429 A1 * | 5/2007 | Subotovsky ................. 705/26 |
| 2007/0121598 A1 | 5/2007 | McGary |
| 2007/0138268 A1 * | 6/2007 | Tuchman .................... 235/383 |
| 2007/0142061 A1 | 6/2007 | Taubenheim et al. |
| 2007/0152812 A1 | 7/2007 | Wong et al. |
| 2007/0197881 A1 | 8/2007 | Wolf et al. |
| 2007/0210155 A1 | 9/2007 | Swartz et al. |
| 2007/0219866 A1 | 9/2007 | Wolf et al. |
| 2007/0239569 A1 | 10/2007 | Lucas et al. |
| 2007/0250613 A1 | 10/2007 | Gulledge |
| 2007/0293237 A1 | 12/2007 | Correal et al. |
| 2008/0025208 A1 | 1/2008 | Chan |
| 2008/0030319 A1 | 2/2008 | McKenna et al. |
| 2008/0032705 A1 * | 2/2008 | Patel et al. ................ 455/456.1 |
| 2008/0040509 A1 | 2/2008 | Werb et al. |
| 2008/0042836 A1 | 2/2008 | Christopher |
| 2008/0056261 A1 | 3/2008 | Osborn et al. |
| 2008/0059297 A1 | 3/2008 | Vallier et al. |
| 2008/0074254 A1 | 3/2008 | Townsend et al. |
| 2008/0113614 A1 | 5/2008 | Rosenblatt |
| 2008/0147461 A1 | 6/2008 | Lee et al. |
| 2008/0170580 A1 | 7/2008 | Goldman et al. |

FOREIGN PATENT DOCUMENTS

| | | |
|---|---|---|
| JP | 02309494 A | 12/1990 |
| JP | 2003223548 | 8/2003 |
| JP | 2005309601 A2 | 11/2004 |
| JP | 2006309280 A2 | 11/2006 |
| KR | 4028108 A | 4/2004 |
| WO | WO9914694 A1 | 3/1999 |
| WO | 2006137065 A2 | 12/2006 |
| WO | WO2007085826 A1 | 8/2007 |

OTHER PUBLICATIONS

Chediak, Mark, "Retail Technology; Grocers Get a Taste of Future; Store Owners Who Want to Stand Out in the Crowd These Days are Embracing Cutting Edge Services," Jan. 21, 2006.*

* cited by examiner

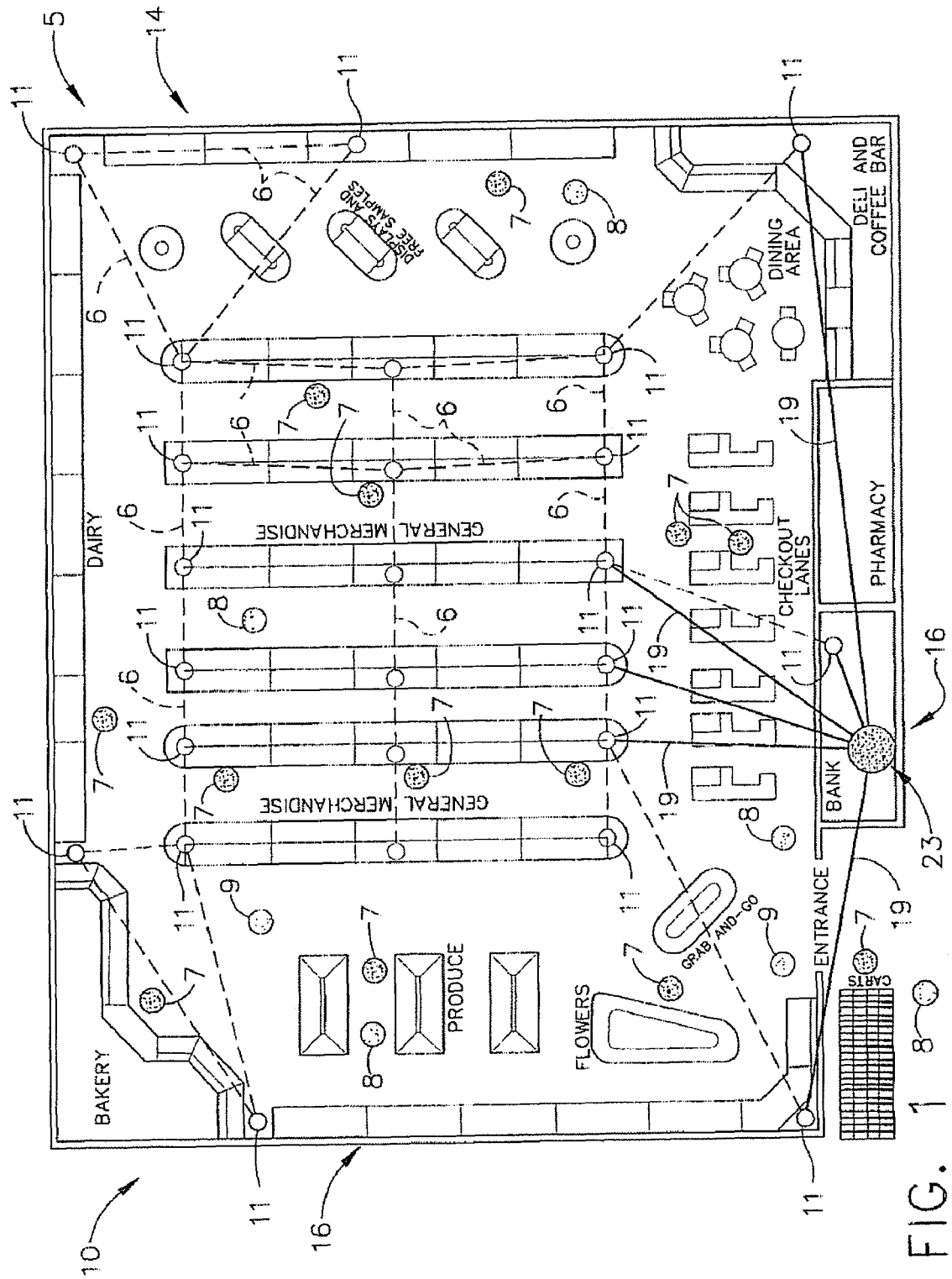

US 7,734,513 B2

SYSTEM OF TRACKING THE REAL TIME LOCATION OF SHOPPERS, ASSOCIATES, MANAGERS AND VENDORS THROUGH A COMMUNICATION MULTI-NETWORK WITHIN A STORE

CLAIMS PRIORITY TO RELATED APPLICATIONS

This patent application cross-references and claims priority to U.S. Provisional Patent Application 61/065,166 filed on Feb. 8, 2008, U.S. Provisional Patent Application 61/011,125 filed on Jan. 15, 2008, U.S. Nonprovisional patent application Ser. No. 12/172,326 filed on Jul. 14, 2008, U.S. Provisional Patent Application 61/069,076 filed on Mar. 12, 2008, U.S. Provisional Patent Application 61/070,344 filed on Mar. 21, 2008, U.S. Provisional Patent Application 61/046,820 filed on Apr. 22, 2008, U.S. Nonprovisional patent application Ser. No. 12/058,705 filed on Mar. 29, 2008, and U.S. Provisional Patent Application 61/046,820 filed on Oct. 31, 2008, which are herein incorporated by reference in full.

FIELD OF INVENTION

The invention is one or more systems for locating a presumed position of an operator in a store using a communication multi-network for communication in the store, wherein an operator is a shopper, an associate, a manager, or a vendor. Specifically, at least one location tracking device is positioned in close proximity to an operator while traveling throughout the store such that the presumed position of the operator about the store may become known to the store itself.

BACKGROUND OF THE INVENTION

Shopping, specifically grocery shopping is a necessary and at times an unpleasant undertaking. For a shopper, frustration can set in as items sought after, go unfound. With the advent of superstores having both grocery and general retail, and thousands of square feet of space through which to navigate, all hope can seem lost especially when shopping during the post-workday rush.

Having the ability to quickly and easily locate seemingly unfindable items to be purchased and the ability for one to know one's position with respect to such items is highly desirous. Also, the store's quick ability to respond to a shopper's query or call for assistance is paramount in today's highly competitive retail environments. To date though, there has not been an effective, low cost or redundant in-store system that provides stores the knowledge of the shopper's location to be able to provide answers and aid to the shopper.

What is therefore needed is a way to know the location of shoppers in relation to the position of associates, also known as store clerks, and managers to aid shoppers as they shop. What is also needed is a means to know and communicate to shoppers the location of seemingly unfindable products desired by shoppers in relationship to the location of shoppers, so that directions or a map may be provided to shoppers so that said shoppers can find and purchase said desired products. This has been achieved through one or more of the embodiments described below and will now be explained with greater detail and particularity.

The prior art is rife with attempts to enhance the shopping experience between a shopper and a store. Many of these attempts have been oriented to move a shopper through a store faster, help a shopper find items on a store shelf and aid a shopper to check out quickly. Unfortunately, many of these attempts have been highly complex, labor intensive, highly inaccurate in terms of locating shoppers in relation to products, extremely expensive to implement, maintain and/or replace. Often, these attempts have negatively impacted store profits, caused higher store costs passed on to the shopper and have been deemed unreliable and undependable in the daily operation of a store's fast-paced environment.

Enhancing a shopper's experience in a store is laudable. The high cost of devices or systems for such enhancement and their impact on a store's bottom line has often been greatly overlooked by the prior art. In the grocery industry, in particular, profit margins are thin (e.g., often no more than one to two percent of a store's total sales) and are highly susceptible to fluctuations in fuel costs, commodity costs, labor costs and many other costs related to daily operations. Such fluctuations can raise incremental store costs in expected and unexpected ways.

As a result of its thin profit margins, the grocery industry, by and large, continually works to contain its operational costs; i.e., the daily costs to keep open and maintain a store. What is therefore needed is one or more low cost, highly effective, and highly reliable in-store location systems for locating items sought by a shopper, for calculating a shopper's proximity to sought after items and for tracking a shopper's travel through and even outside of the store. It is important that such systems serve to enhance, simplify and expedite a shopper's experience with very little, if any, cost passthrough resulting in higher store prices due to expensive end-user components and very little, if any, negative impact to a store's profit margin. This has been achieved through one or more of the exemplary embodiments described below and will now be explained with greater detail and particularity.

The prior art is rife with attempts to enhance retail management. Unfortunately, many of these attempts have been highly complex, labor intensive, extremely expensive to implement, maintain and/or replace. Often, these attempts have negatively impacted store profits, caused higher store costs which are then passed on to the shopper, and have been deemed unreliable in the daily operation of a store's fast-paced environment. One or more systems to track the location of associates and managers is highly desirable, so that the head store manager and store executives can fully analyze the efficiency of associates and managers as they accomplish their daily tasks within the store. This has been achieved through one or more of the embodiments described below and will now be explained with greater detail and particularity.

Lastly, there is a present need for a better system for managing and controlling shoplifting. Present systems monitor shoplifting through radio frequency identification (RFID) tags on certain more expensive products or through monitoring the activity of people in the store through the use of cameras. What is needed therefore is at least one system for monitoring the locations of shoppers, associates, managers, and vendors as they travel throughout the store so that the store can determine if shoppers, associates and vendors are located in permitted areas of the store. The knowledge of the locations of vendors is important for a variety of reasons. For example, store security personnel would likely find it suspicious to discover the location of a vendor of soft drinks near the display of pharmaceuticals or firearms.

Tracking the locations of shoppers, associates, managers and vendors throughout the store is achieved through one or more of the embodiments of the one or more systems described below and will now be explained with greater detail and particularity.

SUMMARY OF THE INVENTION

Accordingly, the invention provides one or more systems of locating a presumed position of an operator within a store, wherein the operator is a shopper, an associate, a manager, or a vendor. Provided is an exemplary system of locating the presumed position of the operator in the store. The exemplary system for locating the presumed position of the operator in the store includes a communication multi-network, at least one logic engine operatively connected to the communication multi-network, and at least one location tracking device positioned in a proximate position to the operator whereby the at least one location tracking device is operatively connected to the communication multi-network and communicates through the communication multi-network to the at least one logic engine. The at least one location tracking device operates as a blind node within the communication multi-network. The exemplary system for locating the presumed position of the operator in the store also includes a map of the store, an X and Y two-dimensional grid superimposed over the map of the store, and a set of X and Y positional coordinates that correspond with the presumed position of the operator on the X and Y two-dimensional grid superimposed over the map of the store. The at least one logic engine of the store tracks the set of X and Y positional coordinates that correspond with the presumed position of the operator in the store.

Moreover, the at least one logic engine tracks substantially simultaneously the presumed positions of all the operators in the store.

Further embodiments of the present invention, as well as the structure and operation of these embodiments of the present invention, are described in detail below with reference to the accompanying drawings.

DESCRIPTION OF THE REFERENCED NUMERALS

In reference to the drawings, similar reference characters denote similar elements throughout all the drawings. The following is a list of the reference characters and associated element:

| | |
|---|---|
| 5 | Store |
| 6 | Multi-network communication line |
| 7 | Shopper |
| 8 | Associate |
| 9 | Manager |
| 10 | Communication multi-network |
| 11 | Multi-network router |
| 12 | Information router |
| 13 | Mesh network organizer |
| 14 | Mesh communication network |
| 15 | ZIGBEE communication network |
| 16 | Star communication network |
| 17 | Mesh communication line |
| 18 | Star communication line |
| 19 | System communication line |
| 20 | Data communication radio |
| 23 | Logic engine |
| 25 | Switch |
| 27 | Gateway server |
| 29 | Store server |
| 50 | Blind Node |

BRIEF DESCRIPTION OF THE DRAWINGS

While the specification concludes with claims particularly pointing out and distinctly claiming the invention, it is believed that the embodiments will be better understood from the following description in conjunction with the accompanying figures, in which like reference numerals identify like elements and in which:

FIG. 1 is a schematic plan view of a store having an exemplary store-based multi-network for communication;

DETAILED DESCRIPTION OF THE INVENTION

Figure 2A:
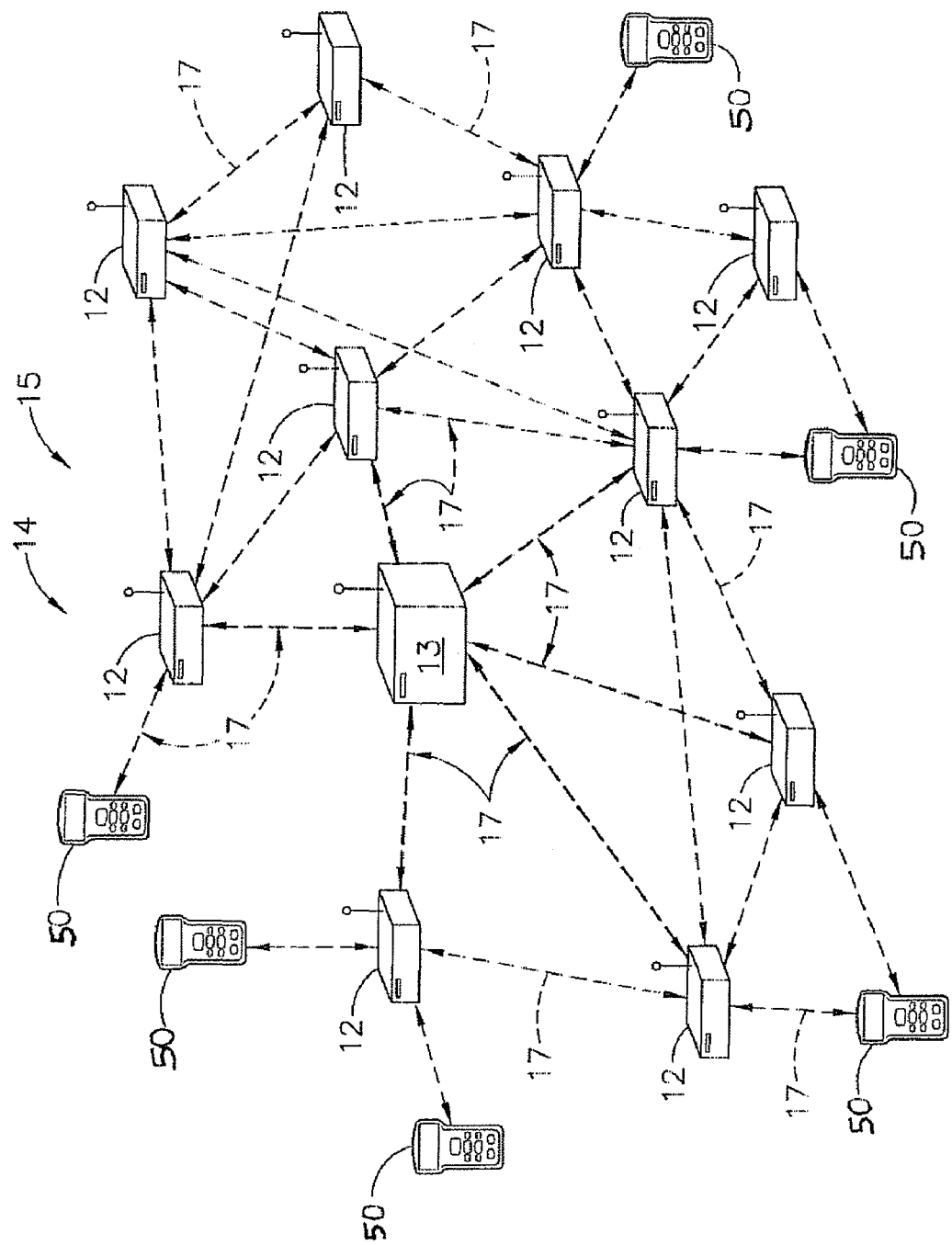
FIG. 2A and FIG. 2B provide a schematic view of an exemplary mesh communication network useful in a store.

The term "store" as used herein means all manner of retail environments in which the purchase of goods occurs and in which shoppers are physically present to purchase such goods including, but not limited to store types like grocery stores, convenience stores, clothing stores, consumer goods stores, specialty stores, manufacturing facilities, warehouses, and many other retail store types.

The term "grocery store" as used herein means the kind of retail environment in which all manner of food, produce, floral products, pharmaceutical products, and traditional grocery products and/or services are offered within a shopping venue.

By the terms "the store knows" and "the store is aware", as used herein, mean that the highest ranking store manager has access to information known to the one or more logic engines and all store servers present in the system, including the location tracking server, if present at all.

By the term "multi-network router" as used herein, means a device which houses at least three MCU radios, at least one that functions as the information router for the mesh communication network and at least two that function as the data communication radio for the star communication network.

Provided herein are one or more systems for locating the presumed position an operator in a store. Herein, the operator is selected from the group consisting of a shopper, an associate, a manager, or a vendor. Since the store tracks the location of a location tracking device which is held in close proximity to the operator, it in fact is not tracking the human, therefore, the operator's locations are presumed. It is possible that the operator will walk away from the location tracking device, in which case the location tracking data of the operator would be inaccurate. The tracking of the location of the location tracking device is accurate within a predetermined tolerated range of error.

Blind nodes include but are not limited to wireless end devices and intelligent shopping carts, which are associated with at least one location tracking device. In exemplary embodiments, blind nodes contain or are in close physical proximity with at least one location tracking device. To be clear, blind nodes are called "blind" because without the location tracking device associated with the blind node and without the one or more systems of tracking location, the location of each blind node would be unknown to the communication multi-network. Each blind node is one of a plurality of electronically devices communicatively coupled to the communication multi-network.

In an exemplary embodiment of the one or more systems, the one or more systems comprise a communication multi-network positioned about the store, and the one or more location tracking devices, operating through either an intelligent shopping cart or a handheld wireless end device herein known as a wireless end device, for providing location tracking data to the store regarding the presumed positions of the operators throughout the store. By the term "location tracking device" as used herein, means a device containing a location detection hardware module that can be used to receive signals from one or more information routers that have known locations within a communication multi-network. The location of each said location tracking device is substantially continuously being communicated to the one or more logic engines. In one or more embodiments, the location tracking device has the means of performing ray tracing calculations and blind node location calculations to determine its own location in relation to the information routers.

In exemplary embodiments the location tracking devices are housed within the wireless end devices and the intelligent shopping carts. In various exemplary embodiments, the location tracking devices are in close physical association with the wireless end devices and intelligent shopping carts. By the terms "intelligent shopping cart" or "ISC" as used herein, mean a shopping cart configured to receive and weigh items placed within it, and to communicate wirelessly with other members of the communication multi-network such as a location tracking server or the one or more logic engines. The intelligent shopping cart operates as a blind node and a mobile end node within the communication multi-network.

The wireless end device is capable of wirelessly communicating through the communication multi-network to other members of the communication multi-network, such as the location tracking server and the one or more logic engines. The wireless end device operates as a blind node and a mobile end node within the communication multi-network. In various exemplary embodiments, the wireless end device is equipped with a "location tracking device" and a "product scanning device". In alternative exemplary embodiments, the wireless end device is equipped with either the location tracking device or the product scanning device. To be clear, product scanning devices are devices capable of scanning barcodes or of taking photographs of barcodes.

In various exemplary embodiments the wireless end device is equipped with an imager that can take photographs to identify bar codes. In exemplary embodiments the wireless end device is permanently assigned to operators. In alternative exemplary embodiments the wireless end devices are temporarily assigned to operators, whereas in still other exemplary embodiments certain wireless end devices are permanently assigned to certain operators, such as shoppers, and certain wireless end devices are temporarily assigned to certain operators, such as vendors.

In exemplary embodiments, whenever the wireless end devices and the intelligent shopping carts are in close proximity to the store's communication multi-network, they substantially and continuously transmit their respective unique identifier addresses to the one or more logic engines. However, in exemplary embodiments of the one or more systems, all of the wireless end devices and the intelligent shopping carts that remain stationary for a certain period of time, for example fifteen minutes, shut down to conserve power. When the wireless end devices and intelligent shopping carts are shut down to conserve power, the substantially continuous transmittal of their respective unique identified addresses and the location tracking of the wireless end devices and the intelligent shopping cart stop until they are in motion again.

In exemplary embodiments of the one or more systems, nearly all wireless communication within the store takes place through the communication multi-network. By the term "communication multi-network" as used herein means a communication network in the store, comprising two or more dissimilar types of communication network types, two or more of the same types of communication networks or some combination thereof. The communication multi-network includes single communication networks architecturally that functionally operate as two or more differently functioning communication networks. For example, the term "communication multi-network" includes a single communication network architecturally that functions as a star communication network and a mesh communication network at the same time.

The term "logic engine" as used herein, means one or more electronic devices comprising a switch and a server or other electronic device capable of performing the functions of the switch, gateway server and other store servers, such as an associate task managing server, an ordering system server, the Point of Sale, the location tracking server or other store computer. In exemplary embodiments, the one or more logic engines serve as the store's main database. Functionally, the one or more logic engines organize, manage and store data received from the communication multi-network. Moreover, the one or more logic engines also provide computation, information storage, organization, response, network notification, data prioritization, event prioritization and other functions. Furthermore, the one or more logic engines route data out to other elements of the communication multi-network such as the wireless end devices and intelligent shopping carts. In various exemplary embodiments, the one or more logic engines have the means of performing ray tracing calculations and blind node location calculations to determine the location of a blind node in relation to information routers.

The one or more systems provide a variety of ways to know and track each presumed location of an operator while said operator operates with an electronic device that is associated with the store's communication network. In particular, in various exemplary embodiments, the one or more systems provide for (1) a variety of ways the identity of the operator becomes known to the store, (2) a means to create a historical progression, which is a collection of the presumed locations of the operator projected onto a two or three dimensional grid superimposed onto a map of the store, and (3) a means to track the time the operator spends at each location while in or about the store while the operator's electronic device is associated with the communication multi-network.

In various exemplary embodiments, the one or more logic engines drive the one or more highly reliable in-store location systems for locating items sought by the operator, for calculating the operator's proximity to sought after items and for tracking the operator's travel through and even outside of the store. In alternative exemplary embodiments, the one or more systems are driven by the location tracking server in place of the one or more logic engines, whereby the location tracking server is connected to the gateway server, which is the gateway to the rest of the members of the communication multi-network.

To be clear, the term "gateway server" as used herein, means a server grade computer that receives data from the communication multi-network of the store through a switch that is being routed by the gateway server to other store servers. The gateway server transmits the non-location information data to the store servers and routes any response back through the star communication network to the appropriate operator. In exemplary embodiments, the star communication network and the mesh communication network are entirely separate networks with a common network switch to the gateway server and the store servers.

Furthermore, by the term "location tracking server" as used herein, means one or more electronic devices that are communicatively coupled to the communication multi-network, wherein the location tracking server is capable of storing, organizing, managing and routing location data regarding the location information regarding operators and things within the store. In exemplary one or more systems, the location tracking server is at least one computer or at least one server grade computer that is one of several store servers connected to the communication multi-network through the gateway server or through the one or more logic engines. In exemplary embodiments, the location tracking server comprises software which performs ray tracing calculations. The location tracking server is capable of storing location data on products, stationary objects and operators within the store. In exemplary systems, the location tracking server creates historical progressions. The location tracking server pairs up the historical progressions with the readable media of products scanned by operators.

In exemplary embodiments the operator's identity is made known to the store and, in particular, when the operator operates with the wireless end device or the intelligent shopping cart. In these instances, the operator is assigned the wireless end device or the intelligent shopping cart or both, either on a temporary or permanent basis. Ideally, when a wireless end device is assigned to the shopper, she scans a readable medium located on her exemplary shopper's card with the product scanning device of the wireless end device. Ideally, when an intelligent shopping cart is assigned to the shopper, she scans a readable medium located on her exemplary shopper's card with the product scanning device of the intelligent shopping cart. Ideally, when a wireless end device is assigned to an associate or a manager of the store, he scans a readable medium located on his employee identification card with the product scanning device of the wireless end device assigned to him.

To clarify, the terms "readable medium" or "bar code" or "barcode" as used herein, mean a unique identifier for an item within the store. A readable medium is readable, because it may be read and understood by an electronic device. Sometimes readable media are able to read and understood by humans in addition to being able to be read by machines Examples of a readable medium include the following: Universal Product Code (UPC), Radio Frequency Identification (RFID) tags and Electronic Product Codes (EPC) tags.

Then in the steps to identify the shoppers, the wireless end devices and/or intelligent shopping carts transmit through the communication multi-network the exemplary shopper's card information to the one or more logic engines. The one or more logic engines access an electronic file that contains the exemplary shopper's card information and personal information voluntarily provided when the shopper registered with the store to receive the exemplary shopper's card. At that point in time, the one or more logic engines store the unique identifier address of the wireless end device in the shopper's electronic file.

Likewise, in the steps to identify associates and managers, the wireless end devices and/or intelligent shopping carts transmit through the communication multi-network the exemplary employee identification card information to the one or more logic engines. The one or more logic engines access an electronic file that contains the exemplary employee identification card information and the employee's identification information that the manager or associate provided upon employment. At that point in time, the one or more logic engines store the unique identifier address of the wireless end device and/or the intelligent shopping cart in the employee's electronic file.

Since the store associates each wireless end device's and each intelligent shopping cart's unique identifier address with a particular operator's identification information, and since the wireless end devices and the intelligent shopping carts transmit their respective unique identifier addresses to the one or more logic engines each time they are in close proximity of the store, the store is aware of the operator's identity anytime the operator operates in close proximity of the store and while he operates with a permanently assigned wireless end device or intelligent shopping cart. Exemplary embodiments of the communication multi-network will be addressed in turn.

In exemplary embodiments, the communication multi-network of the system includes at least one mesh communication network and at least one star communication network. Working together, though not necessarily dependently, the mesh communication network and the star communication network enable the store to track the location of operators and products and to transmit and receive location information through the communication multi-network between the location tracking devices and either the one or more logic engines or the location tracking server.

In exemplary embodiments, the communication multi-network include two or more star communication networks positioned about the store to enable data communication between location tracking devices and the store, specifically the one or more logic engines.

In exemplary embodiments, a ZIGBEE® network (ZIG-BEE is a registered trademark of ZigBee Alliance for a wireless communication network, which operates within the IEEE 802.15.4 communication protocol) is an exemplary communication network to build the mesh communication network and the star communication network. The ZIGBEE network is targeted at radio frequency (RF) applications that require a low data rate, long battery life and secure networking. Persons with ordinary skill in the art will appreciate that other protocols can be used to operate both the mesh and the star communication networks.

In exemplary embodiments, the mesh communication network is used for determining the location of members of the mesh communication network, and the star communication network is used for communicating non-location information data. The star communication network is used to transmit all non-location information data directly to the gateway server.

The operator operates throughout the store using either a location tracking device attached to or housed within either the wireless end device or the intelligent shopping cart. In exemplary embodiments, the operator communicates human readable messages and machine readable information (barcode information) to the one or more logic engines through the star communication network, while the X and Y positional coordinates of the operator are tracked through the mesh communication network.

In exemplary embodiments, the mesh network organizer assigns addresses to substantially all of the members of the mesh communication network. The mesh network organizer is the single point of entry to the mesh communication network to and from the gateway server. By the term "mesh network organizer" as used herein, means a radio within the mesh communication network of the communication multi-network. In exemplary embodiments, the mesh network organizer routes location data to and from information routers and the logic engine. The mesh network organizer transmits data through an Ethernet cable to the one or more logic engines. In exemplary embodiments, functionally, the mesh network organizer routes location tracking data of the associate's wireless end devices and the shopper's wireless end devices to the one or more wireless end devices used by one or more managers or associates.

Moreover, information routers are fixed members of the mesh communication network. Information routers are end nodes, specifically stationary reference nodes, within the mesh communication network. Information routers receive and transmit information through the communication multi-network to and from the location tracking devices, the intelligent shopping carts, the wireless end devices, the mesh network organizer, other information routers and other members of the mesh communication network. Each information router comprises at least one radio.

Each information router transmits Received Signal Strength Indication (RSSI). In exemplary embodiments, the X and Y positional coordinates in two dimensional location tracking systems and the X, Y and Z coordinates in three dimensional location tracking systems, belonging to the position of the information router and its unique identifying address are transmitted to its closest data communication radio, any requesting wireless end device, and any requesting intelligent shopping cart.

To be clear, the term "data communication radio" as used herein, means a radio within the star communication network of the communication multi-network. The data communication radio is or acts as a hub node, also known as a central node, of the star communication network of the communication multi-network. Each data communication radio routes non-location information data, between the one or more logic engines and the wireless end device, the intelligent shopping cart, and other communication devices capable of communicating wirelessly with the store's communication multi-network. In exemplary embodiments, each data communication radio transmits the non-location information data through an Ethernet cable to the one or more logic engines. Examples of the non-location information data transmitted between operators and the one or more logic engines through the data communication radio include by are not limited to: barcodes, requests for assistance in finding products within the store, lists of orders to be performed by associates. The data communication radio broadcasts or radiates out radio waves containing the non-location information data to a group of members of the star communication network, wherein said group of members of the star communication network may or may not include every member of the star communication network.

The overall shopping experience is improved when the store reliably and consistently sends associates and/or managers to shoppers in need of assistance even before the shopper asks for assistance. In various exemplary embodiments, the store becomes aware that the shopper needs assistance when the store becomes aware that the shopper has been in a stationary position for a predetermined period of time, for example five minutes. With this knowledge in place, software on the one or more logic engines triggers a message, which commands the associate to assist the shopper in need of assistance, to be sent to the wireless end device used by the closest associate to the shopper in need of assistance.

FIG. 1 provides an exemplary schematic plan view of a store 5. In particular, FIG. 1 shows a top view of a section of the store in which shoppers 7, associates 8 and managers 9 are positioned and associated within communication multi-network 10 for wireless communication between members of the communication multi-network 10. Vendors are not shown, but a person with ordinary skill in the art will understand that they could be a 7, 8 or 9 as shown in FIG. 1.

The communication multi-network is positioned within and about the store. In exemplary embodiments, the communication multi-network is positioned within and about the store. In exemplary embodiments, a two-dimensional X and Y grid or a three-dimensional X, Y and Z grid is superimposed over a map of the store.

FIG. 1, shows an exemplary embodiment of the communication multi-network, wherein the communication multi-network comprises one or more mesh communication networks 14 and one or more star communication networks 16. For greatest clarity, FIG. 1 shows a multi-network router 11 operates for both the one or more mesh communication networks and the one or more star communication networks. Thus, each multi-network router preferably contains the components for transmission of data through said one or more mesh communication networks and one or more star communication networks. The shoppers, associates, managers and vendors are each connected through multi-network communication lines 6 and multi-network routers to both the one or more mesh communication network and the one or more star communication networks 16 of communication multi-network 10.

Figure 2B:
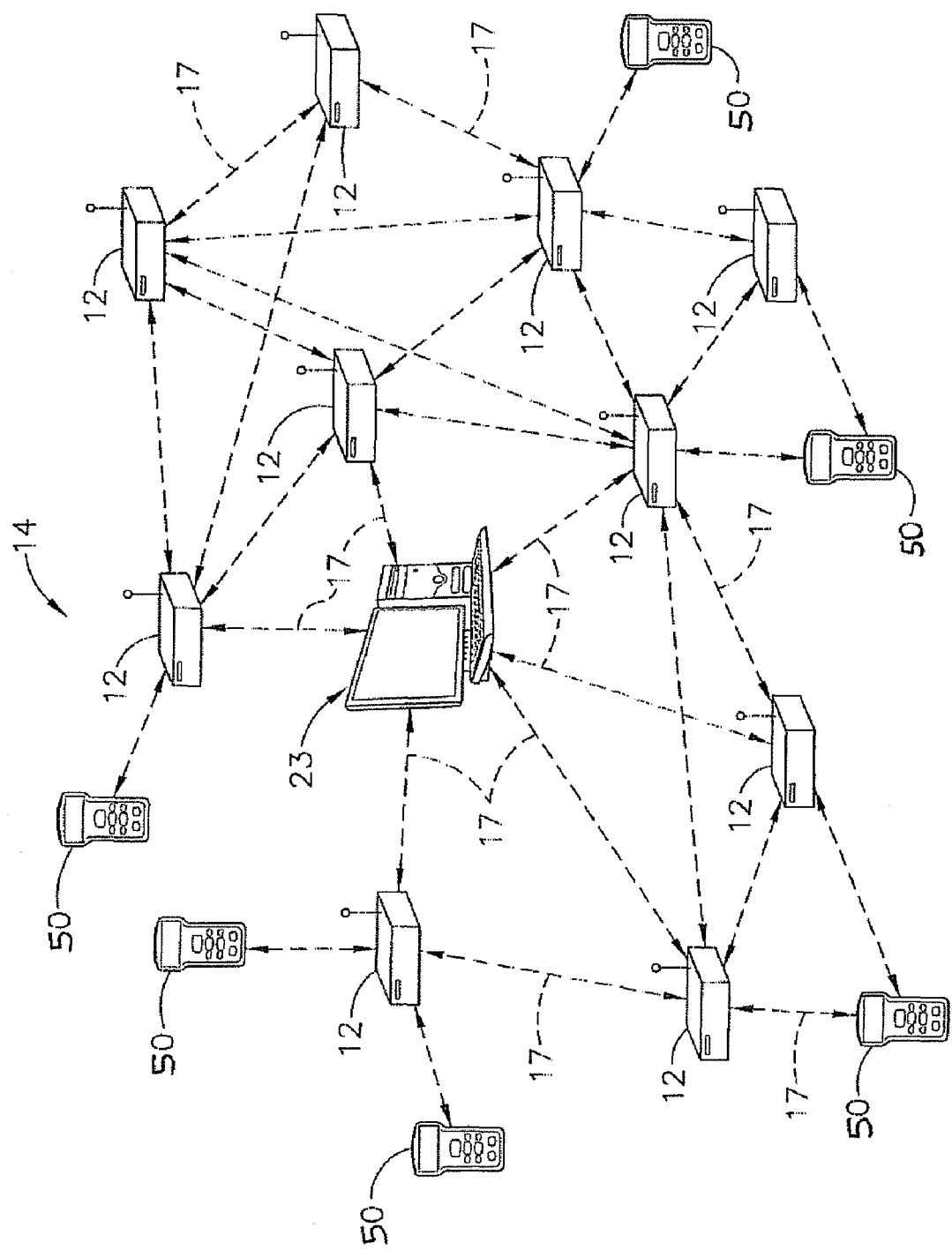

In exemplary embodiments, each multi-network router is placed in a location that is out of reach of the shoppers shopping in the store. An exemplary area of placement for each multi-network router is close to or in the ceiling of the store. Preferably, though not necessarily, each multi-network router 11 houses at least three radios: a first radio functioning as the information router 12 (as shown in FIGS. 2A, 2B, and 5) of the one or more mesh communication networks 14, and at least two more radios functioning as the data communication radio 20 (as shown in FIGS. 3A, 3B, 4 & 5) of the one or more star communication networks 16.

In FIG. 1, system communication lines 19 are shown connecting each multi-network router 11 to the one or more logic engines 23. System communication lines 19 may be either wireless or wired. Preferably, system communication lines 19 are wired and are shown with solid lines to indicate that they are wired in FIGS. 1, 2 and 3. Ethernet cable is the exemplary wired connection device between each multi-network router 11 and one or more logic engines 23. Exemplary system communication lines for use herein are those of the type suitable for use within an Ethernet physical layer operating within the IEEE 802.3 communications standard. An exemplary Ethernet cable is the "twisted pair": RJ45 and CAT-x copper type. Such cable is designed to facilitate digital transmission of voice and data over copper wiring with high quality and at high speeds.

Also shown in FIG. 1 are multi-network communication lines 6 that correspond to zones of transmission between multi-network router 11 within mesh communication network 14. In practice, the multi-network communication lines, though represented as straight lines for purposes of illustration, are not necessarily straight lines, but more accurately are circular zones of transmission emanating from each multi-network router. The multi-network communication lines are also shown between multi-network routers and shoppers, associates and managers. Although not shown, multi-network communication lines also connect (1) managers to other managers, associates and shoppers, (2) associates to managers, associates and shoppers, (3) shoppers to associates and managers, but preferably do not connect shoppers 7 to other shoppers 7 and (4) vendors to associates and managers. Through such zones (multi-network communication lines 6) of each multi-network router, data of all kinds are transmitted and received.

Preferably each multi-network router 11 operates for both the one or more mesh communication networks 14 and the one or more star communication networks 16. The multi-network router comprises at least three microcontroller units (MCUs). One MCU is used for the one or more mesh communication network and at least two are used for the one or more star communication networks. Each MCU is preferably a system-on-a-chip type of MCU and comprises a control unit, one or more registers, an amount of ROM, an amount of RAM and an arithmetic logic unit (ALU).

The Texas Instruments CC2431 MCU is an exemplary and exemplary MCU for use as one of the radios for the one or more mesh communication networks 14 and for one of the at least two radios used on the one or more star communication networks 16, because of its ability to readily transmit data through mesh communication network 14 and one or more star communication networks 16 at prescribed data transmission rates. Also, the CC2431 MCU can provide location detection functions within communication multi-network 10 herein. Alternatively, the Texas Instruments CC2430 MCU is an exemplary and exemplary MCU for use as one of the radios for the one or more mesh communication networks 14 and for one of two radios used on the one or more star communication networks 16. The third radio of the at least three radios of the multi-network router 11 is more powerful radio than those of the Texas Instruments CC243x series.

In practice, the data transmission rate within the mesh communication network 14 is preferably configured to be at least 125 kilobytes per second (KB/s). The data transmission rate within one or more star communication networks 16 is preferably configured to be at least 250 KB/s. The interface between the operator and the communication multi-network 10 is wireless and is accessed by the operator through the blind node.

FIG. 2A provides a schematic representation of an exemplary mesh communication network 14 for use in the invention herein. Provided are the information routers 12 that are in wireless communication along the mesh communication lines 17 with members of the one or more mesh communication networks. Members of the one or more mesh communication networks include blind nodes, weighing devices and one or more mesh network organizers 13.

Mesh communication lines 17 may be wired or wireless. Preferably, mesh communication lines are not actual wired lines, but are meant to portray the direction and existence of wireless lines of communication between information routers 12 that make up the one or more mesh communication networks 14 and other components like the one or more wireless end devices 40 and a mesh network organizer 13. The mesh network organizer is connected along system communication lines 19 (shown in FIGS. 1, 3A, 3B, 4 & 5) to one or more logic engines 23. The one or more mesh communication networks provide many benefits including low power consumption, low cost of operation, efficient communication within a defined space and low cost for maintenance.

As shown in FIG. 2A, the information routers 12 have the ability to communicate with at least one of the other information routers 12 in the one or more mesh communication networks 14. Preferably, each information router 12 is able to communicate with every other mesh network member, for example at least one blind nodes 50.

In exemplary embodiments, the one or more mesh communication networks 14 are a local area network (LAN) that employs one of two connection arrangements. One arrangement is a full mesh topology, while another arrangement is a partial mesh topology. In the full mesh topology, all of the information routers 12 are wirelessly connected to one another and may receive and transmit information to every other information router within the one or more mesh communication networks. In the partial mesh topology, each information router is wirelessly connected to some, but not all, of the information routers available within the one or more mesh communication networks.

Suitable data transfer through the one or more mesh communication networks include location data and non-location information data, such as voice data and digital messages between associate and manager through the one or more mesh communication networks. However in preferred embodiments, the one or more mesh communication networks are limited to small packets of data, such as the location data, which includes X and Y positional coordinates. Preferably, the location tracking functionality of the communication multi-network 10 is conducted over mesh communication network, while larger packets of data, such as the non-location information data, are communicated through the one or more star communication networks. The information routers 12 do not necessarily communicate with each other, but instead provide location data to each blind node 50, which includes, but is not limited to wireless end devices and intelligent shopping carts.

In exemplary embodiments, herein, the location tracking devices associated with the blind nodes 50, calculate their own X and Y positional coordinates through triangulation software or other location tracking software installed onto the blind node. The information routers are aware of their respective X and Y positional coordinates. In exemplary embodiments, the one or more logic engines 23 inform the information routers of their respective X and Y positional coordinates. The information routers are connected to the mesh network organizer 13 through the communication lines 19 (shown in FIG. 6) to the one or more logic engines 23 (FIGS. 1 and 2B).

An exemplary embodiment of the mesh communication network 14 used herein is a ZIGBEE network 15. As is shown in FIG. 2A, the ZIGBEE network is formed in part by a mesh of information routers 12 whereby each information router 12 transmits to and receives transmissions from one or more information routers within the ZIGBEE network; i.e., either in a full mesh topology or a partial mesh topology.

The benefits of using ZIGBEE network 15 as the exemplary one or more mesh communication networks 14 herein are several. ZIGBEE networks in a mesh communication network are known for their low power consumption, low cost of implementation, high density of component use (e.g., the use of dozens, if not hundreds, of information routers 12 and/or wireless end devices 40 for one mesh communication network), and its simple communications protocol. ZIGBEE networks are intended for use in wireless communication networks requiring low data rates and low power consumption.

In its simplest form, the ZIGBEE network herein comprises one or more information routers 12, at least one mesh network organizer 13, and the one or more blind nodes 50. The mesh network organizer is a device that routes data through the one or more of information routers within the ZIGBEE network. The mesh network organizer is connected to the one or more logic engines 23 through the system communications line 19. ZIGBEE network 15 may either be of the non-beacon type or the beacon type.

ZIGBEE network 15 may either be of the non-beacon type or the beacon type. In a non-beacon enabled network (i.e., those whose beacon order is 15), information routers 12 have data receivers that are preferably continuously active. The non-beacon enabled type of ZIGBEE network allows for heterogeneous networks of multiple device types in which some devices receive continuously, while others only transmit when an external stimulus from members of the ZIGBEE network, such as the blind nodes, is detected.

A known example of an element within a heterogeneous network is a lamp having a wireless light switch. The ZIGBEE node at the lamp receives constantly since it is connected to the lamp's power supply while a battery-powered light switch remains "asleep" or inactive until the light switch is thrown. The light switch then activates, sends a command to the lamp, receives an acknowledgment, and returns to a state of inactivation. In a beacon enabled network, information routers within ZIGBEE network transmit periodic beacons to confirm their presence to other network nodes, such as the blind nodes. In an exemplary beacon enabled ZIGBEE network, blind nodes and the information routers power down between beacons, thus lowering their duty cycle and extending battery life when applicable.

In non-beacon enabled networks, power consumption can be higher since at least some of the information routers within communication multi-network are always active, while some others may be inactive. In exemplary embodiments, substantially all of the information routers within communication multi-network are continuously active. To preserve power, a beaconing type of the ZIGBEE network is exemplary for grocery stores.

FIG. 2B provides an exemplary schematic representation of the functionality of the one or more mesh communication networks 14 for use in the invention herein. This FIG. 2B shows that ultimately the one or more mesh communication networks 14 transfer data between the members of the one or more mesh communication networks such as the information routers 12 and the blind nodes 50 to the one or more logic engines 23.

Figure 3A:
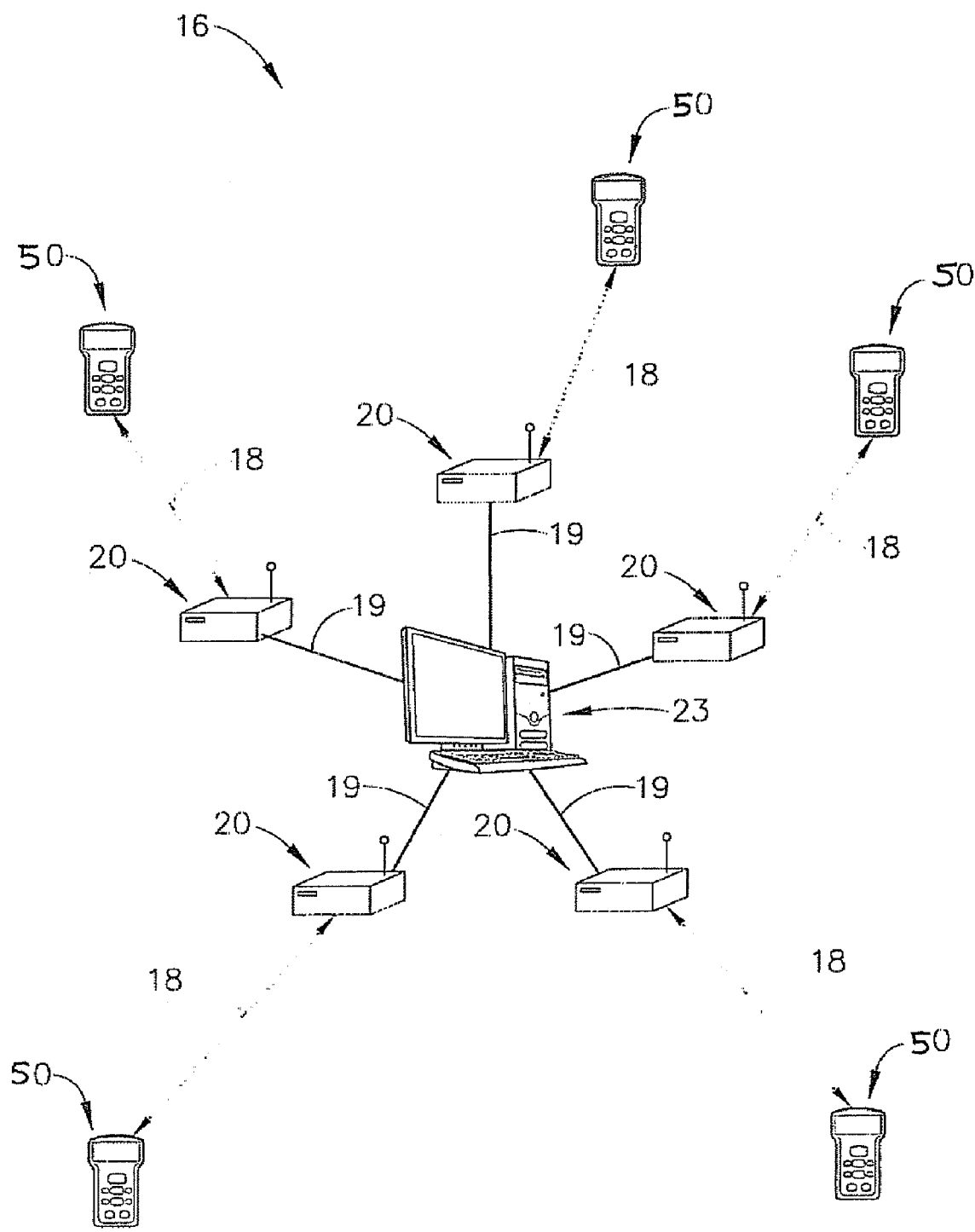
FIG. 3A and FIG. 3B provide a schematic view of an exemplary star communication network useful in a store.

FIG. 3A provides an exemplary representation of the one or more star communication networks 16. Herein, the data communication radios 20, whether housed in their own devices or housed with the information routers 12 in a multi-network router 11 (as shown in FIG. 1), do not communicate directly with one-another but instead communicate directly with the one or more logic engines 23 along system communication lines 19.

The one or more star communication networks 16 are particularly useful and important to the communication multi-network 10. With their data transmission rate of about 250 KB/s or more, the one or more star communication networks are the exemplary communication networks of the communication multi-network to carry data streams that require higher data transmission rates for speed and efficiency. Preferably, the one or more star communication networks are used for communicating the non-location information data, such as the voice data, pictures, video, financial transaction data, and other data types best suited for about 250 KB/s transmission rate in place of or in addition to about 125 KB/s transmission rate provided by the one or more mesh communication networks. However, it is possible to transmit the non-location information data, requiring higher data transmission rates provided by one or more star communication networks, through the one or more mesh communication networks 14.

The exemplary one or more star communication networks herein operate within the Institute of Electrical and Electronics Engineers (IEEE) 802 communications protocol. IEEE 802 refers to a family of IEEE standards dealing with local area networks and metropolitan area networks. More specifically, the IEEE 802 standards are restricted to networks carrying variable-size data packets. In contrast, in cell-based networks, data is transmitted in short, uniformly sized units called cells for use within, for example, cell phones. Though exemplary, it is acknowledged that one or more star communication networks 16 may operate within multiple communication protocols including but not limited to BLUETOOTH (IEEE 802.15.1 and 802.15.2), WIMEDIA (IEEE 802.15.3), WI-FI (IEEE 802.11b), Wi-Fi5 (IEEE 802.11a/HL2) and other wireless protocols like exemplary protocol 802.15.4 as noted hereinabove.

Figure 3B:
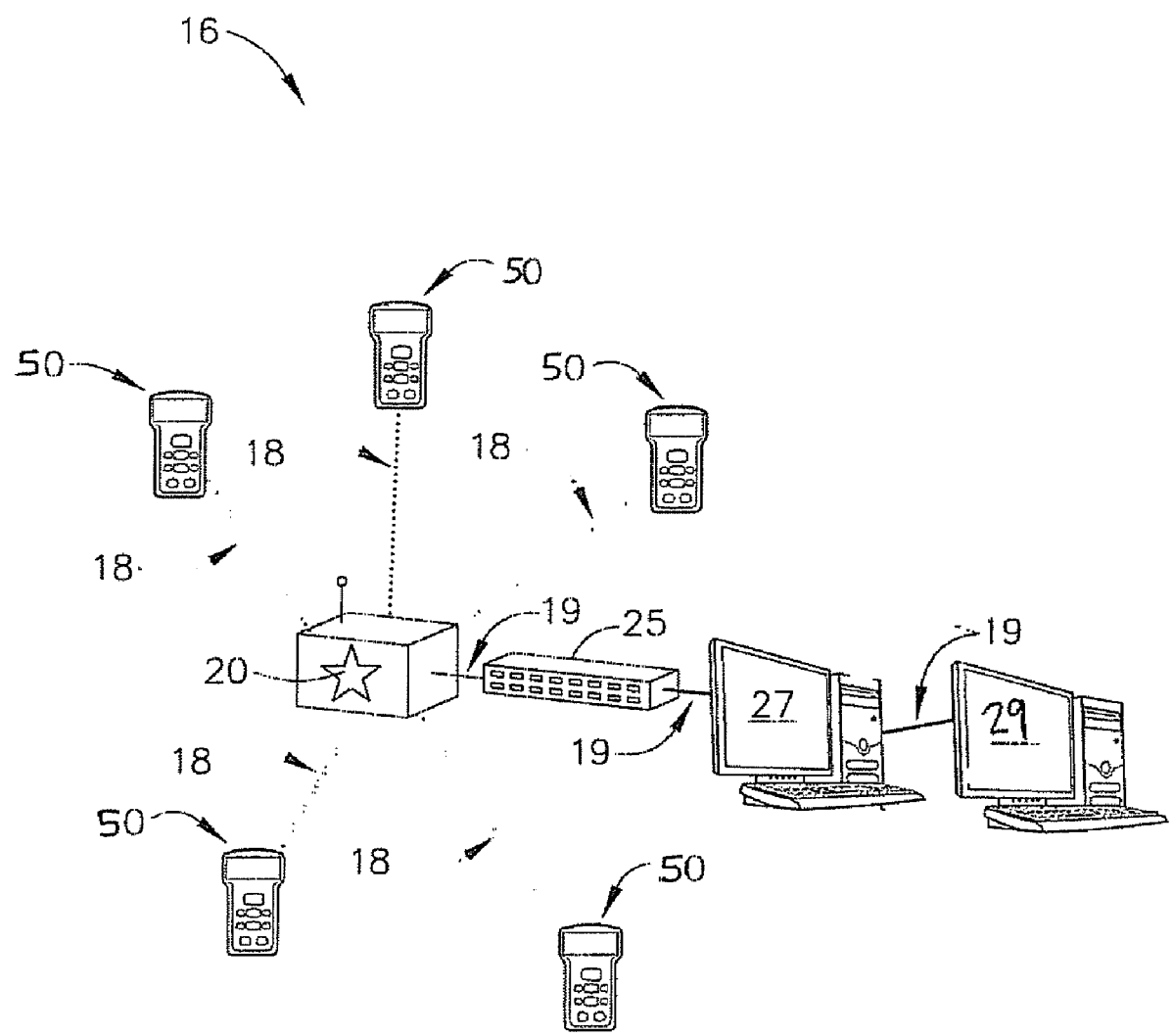

FIG. 3B provides an exemplary representation of the communication multi-network 10. It shows clearly that the information routers 12 of the one or more mesh communication networks 14 provide a signal to the blind nodes 50. In FIG. 3B, the information routers provide the blind nodes 50 with the X and Y positional coordinates of the information routers. The blind nodes 50 either perform the calculations necessary to provide its own location in the X and Y positional coordinates or it sends a signal out through the one or more star communication networks 16 to the one or more store servers 29, such as the location tracking server, to have the calculations done at that level of the communication multi-network 10. Under either scenario, the location of each blind node 50 is known to the one or more logic engines 23 (shown in FIG. 1) or the location tracking server, through the data exchanged between the blind nodes and the information routers of the one or more mesh communication networks.

In exemplary embodiments, substantially all substantive communication between the blind nodes 50, such as the wireless end devices and intelligent shopping carts, is conducted through the data communication radio 20 and the switch 25 and the gateway server 27 and the appropriate store server 29, which is often the location tracking server.

Figure 4:
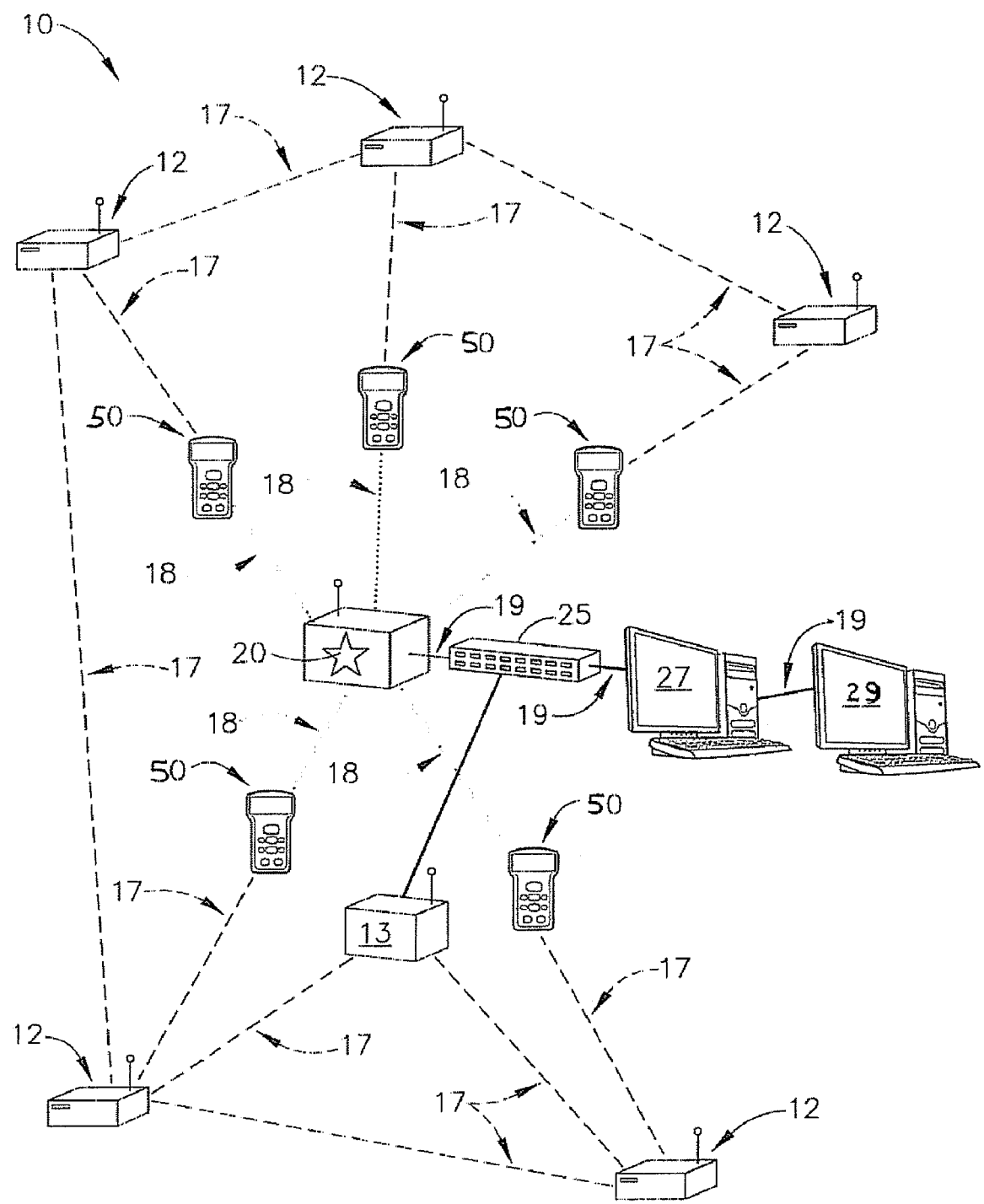
FIG. 4 provides a schematic view of a store providing an exemplary communication multi-network with one star communication network and one mesh communication network useful in a store.
Figure 5:
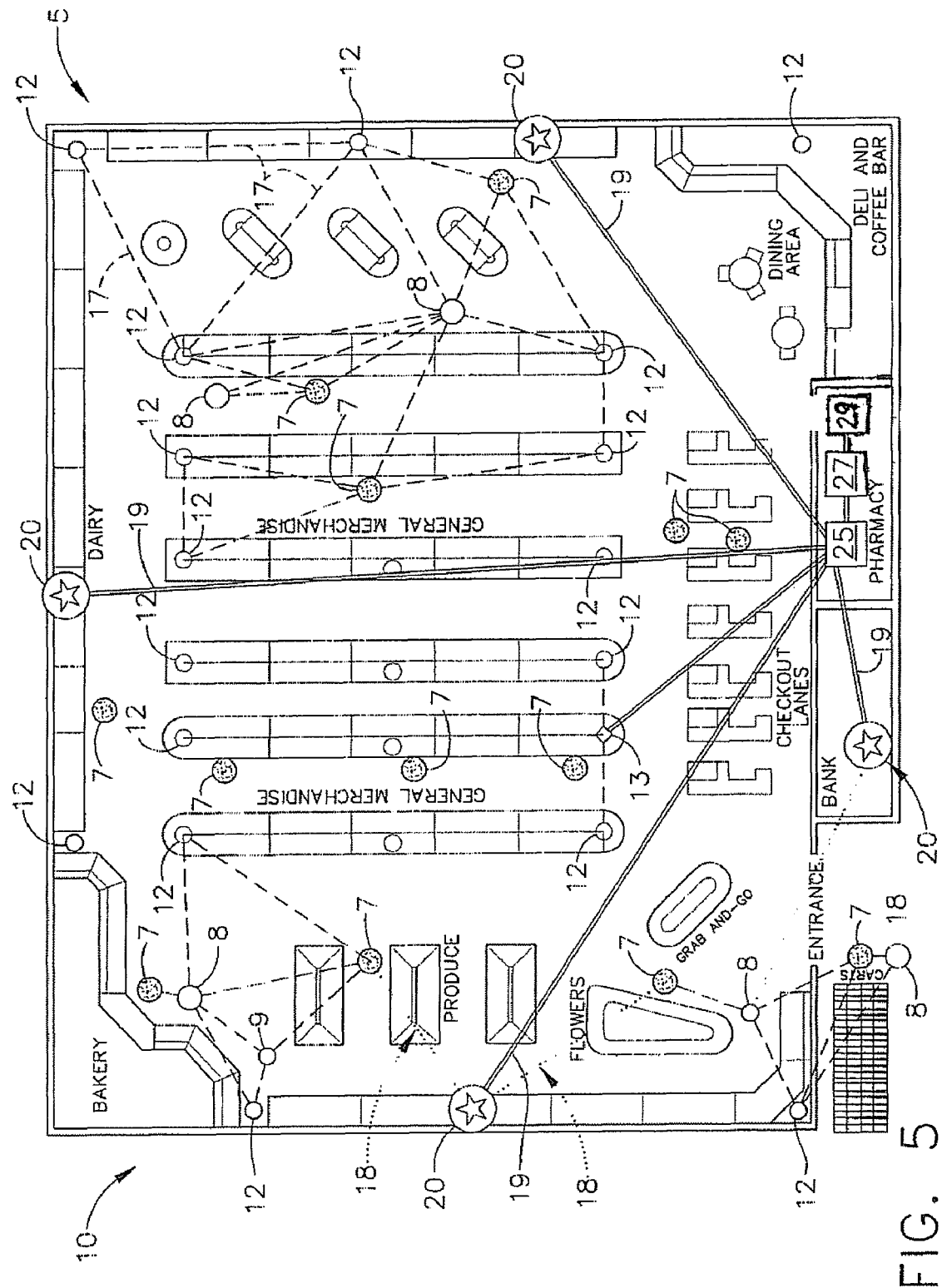
FIG. 5 provides a schematic view of a store providing the exemplary communication multi-network.

FIG. 4 provides an exemplary representation of the communication multi-network 10. It shows clearly that information routers 12 of the one or more mesh communication networks 14 provide a signal to the blind nodes 50, which includes the wireless end devices and intelligent shopping carts, wherein as in the exemplary embodiments above, the blind nodes 50 are associated with one or more location tracking devices.

In FIG. 4, the information routers provide the blind nodes with the X and Y positional coordinates of the information routers. The blind nodes either perform the calculations necessary to provide their own location in X and Y positional coordinates or they send a signal out through the one or more star communication networks 16 to the one or more store servers, such as the location tracking server. As stated above, both the one or more logic engines and the location tracking server are capable of performing the ray tracing and location tracking calculations. Under either scenario, the location of each blind node is known to one or more of store servers through the data exchanged between blind nodes 50 and the information routers 12 of the one or more mesh communication networks 14. In exemplary embodiments, the location tracking server performs the location tracking computations instead of having said computational work being performed on the blind nodes.

The location tracking computations use information (the X and Y positional coordinates of the nearest information router) provided by blind node to the location tracking server. The nearest information router (to the blind node) receives the X and Y positional coordinates of the blind node from the mesh network organizer 13, which receives the X and Y positional coordinates from the location tracking server. In any event, the location of the blind node on the map of the store (shown in FIG. 1) is known to both the blind node and location tracking server, through the one or more mesh communication networks 14 of communication multi-network 10.

FIG. 5 shows an alternative exemplary embodiment, an exemplary top schematic view of the store with multiple star communication networks 16. Also shown in FIG. 5 is the one or more mesh communication networks in combination with multiple star communication networks. Persons of skill in the art will readily recognize that though FIG. 5 shows multiple star communication networks and one or more mesh communication networks, it is possible that the communication multi-network 10 comprises only multiple star communication networks without the presence of the one or more mesh communication networks.

In FIG. 5 as in FIG. 1, the mesh communication lines 17 are shown connecting each information router 12 to the mesh network organizer 13 within the one or more mesh communication networks 14. In addition, the mesh communication lines exist between the information routers within the mesh communication network. In practice, the line of communication, though represented as straight lines for purposes of illustration, are not necessarily straight lines. Rather, each information router operable within the one or more mesh communication networks produces a limited zone of communication through which intra-communication between information router occurs.

Star communications lines 18 exist between the blind nodes, such as the wireless end device and the intelligent shopping cart used by any of the group of shoppers 7, associates 8, managers 9, and vendor (not shown). The star communication lines also connect the blind nodes with the data communication radios 20, which function as the hub of the one or more star communication networks 16. The star communication lines may be either wireless or wired. Preferably, the star communication lines are wireless.

The system communication lines 19 are shown connecting data communication radio 20 and the one or more logic engines 23. The system communication lines are shown connecting the mesh network organizer 13 with the one or more logic engines 23.

For the communication multi-network 10 that contains the two or more star communication networks 16, each data communication radio shown for each of the one or more star communication networks is connected through system communication lines to the one or more logic engines 23 that operate as a master network coordinator for substantially all of the members of the communication multi-network.

FIG. 6A through FIG. 6D provide flowcharts of exemplary embodiments of the one or more systems for calculating, storing and keeping track of the location of the presumed location of the operator within the store; wherein every electronic communication takes place through the one or more mesh communication networks 14.

Before the location of the blind node 50 is determined and tracked, the store is mapped. To map each location to a distinct place in an environment like store, a two dimensional or a three dimensional grid is used.

In exemplary embodiments, the first steps of determining the location of blind nodes 50 is conducted over the one or more mesh communication networks 14 of the communication multi-network 10. Furthermore, the steps of relaying the X and Y positional coordinates of the blind node and each information router's 12 signal strengths (regardless of whether they are measured) are conducted over the one or more star communication networks 16 of the communication multi-network 10. The mesh network organizer 13 organizes the one or more mesh communication networks by assigning a temporary unique identifying address to each of the information routers 12. The one or more logic engines 23 or the alternative store server 29, such as a location tracking server, assigns permanent X and Y positional coordinates to each information router 12. Each information router 12 is aware of its respective X and Y positional coordinates and its temporary unique identifying address.

In alternative exemplary embodiments, the one or more systems of calculating and tracking the location of the blind nodes 50 within the communication multi-network of the store is conducted over the one or more star communication networks.

At step 200, the blind node is shown by a number "50". Blind node 50 is in very close physical association and is communicatively coupled with a location tracking device. Thus, the blind node is associated with an operator operating with a location tracking device associated with either a wireless end device or an intelligent shopping cart.

In step 205, the blind node 50 sends a signal that is received by the closest information router 12 (shown in step 210) within the communication multi-network 10. In step 205, the blind node 50 sends out a signal asking the question "where are you?" or more specifically, "what are your coordinates?" A person with ordinary skill in the art will appreciate that different questions may be asked, but that the basic tenet remains the same—that the blind node seeks out and receives the X and Y positional coordinates of the information router 12. The information router 12 shown in step 210, answers the question in step 215 to establish the location of the blind node 50 within store. When the closest information routers 12 receive the signal asking the question, they transmit signals back to the blind node 50. When the blind node 50 receives the signal from each information routers 12 that is closest to the blind node 50, the blind node 50 receives two pieces of information: (1) the X and Y positional coordinates of each information router 12 that responded and (2) the attendant signal strength of each information router 12 that responded.

Figure 6A:
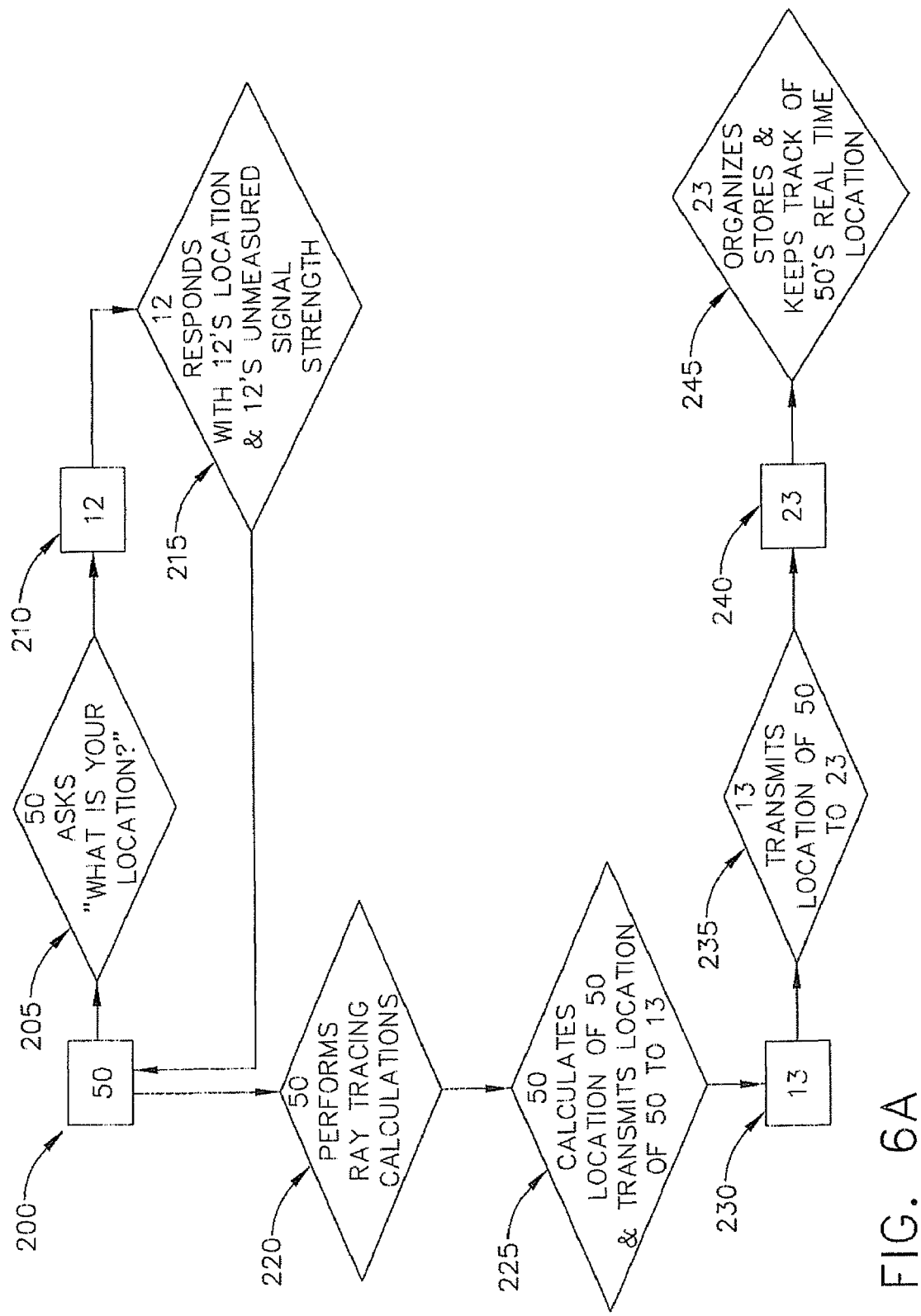
FIG. 6A, FIG. 6B, FIG. 6C and FIG. 6D provide flowcharts of exemplary embodiments of a system for calculating, storing and keeping track of the location of the presumed location of an operator within the store wherein communication from the tracking device to the one or more logic engines take place over the mesh communication network.

As shown here in FIG. 6A, the blind node 50 measures the attendant signal strength received from each responding information router 12.

Next, in a step not shown, the blind node 50 measures the attendant signal strength received from the information router 12 that responded to the signal asking the question. In step 220, with the signal strengths of each received signal measured and thereby known by the blind node 50, the blind node 50 preferably uses ray tracing calculations with the attendant signal strengths as inputs to calculate its position with respect to the information routers 12 that responded. The output of such calculations is the location, presented in X and Y positional coordinates of the blind node 50. Thus, as shown in step 225 of FIG. 6A, the blind node 50 calculates its position along the X and Y positional coordinate system of the store.

As shown in step 225, once calculated, the blind node 50 transmits its X and Y positional coordinates through the one or more mesh communication networks 14 to the mesh network organizer 13 (shown in step 230). Then, in step 235, the mesh network organizer 13 transmits the X and Y positional coordinates of the blind node 50 to either the one or more logic engines 23 (shown in step 240 of FIG. 6A) or the location tracking server 31 (not shown). As depicted in step 245, the one or more logic engines 23 or the location tracking server (not shown in FIG. 6A) organizes, stores and then keeps track of the blind node's 50 various locations throughout the store.

Ideally, a store computer system, whether it be the one or more logic engines 23 or the one or more store servers 29, such as the location tracking server (not shown in FIG. 6A), keeps track of every blind node within the store and thereby regulates and controls the operation of the one or more systems herein. Also, ideally, the location function inherent in every exemplary blind node 50 operates continuously or nearly continuously during the time of its operation within store. Thus, the process described hereinabove for FIG. 6A, occurs substantially continuously such that the location of any given blind node within store may be calculated and thereby known moment by moment and stored by the one or more logic engines 23 or the one or more location tracking server. Such storage of the blind nodes' positions within the store at all or substantially all of each blind node's locations builds an important history of blind nodes' locations in the store.

It is important for the communication multi-network to be robust. Specifically, the communication multi-network should have the ability to support a multitude of location tracking devices of the type disclosed herein. The number of location tracking devices employed by the one or more systems at any one time will fluctuate depending upon the time of day, the date and store promotional periods. The communication multi-network allows for the ready operation of location tracking devices and allows for the tracking of the location tracking devices over time—all of this happening substantially in a continuous manner throughout the life and operation of the one or more systems. Without such robust operation of the communication multi-network, the ability to meet the needs of the operators in real time is compromised.

When a shopper scans items for purchase with her wireless end device, which is an example of a blind node, within the store, actual, real time shopper data is gathered by the one or more location tracking systems herein described. The store may gather such actual, real time shopper data, which can be stored for later analysis or transmitted in real-time to one or more interested parties (e.g., consumer goods companies). To date, consumer goods companies, selling their wares in the stores, are rarely able to track actual, real time shopper data such as product selection at the point of such selection. Instead, these consumer goods companies use electronic simulations based on imprecise sales data to approximate shoppers' behavior and spending within the store. With the one or more systems herein for tracking each shopper's presumed location within the store herein, shoppers' actual, real-time shopping habits via their scanning of items for purchase and the tracking of the shoppers' various locations within the store may be noted and cataloged.

In the example from above, when the consumer goods company asks a retailer to place an end cap of its product at the end of an aisle for a predetermined amount of time, e.g., five days, the consumer goods company now is able to: (1) gauge the traffic around its end cap or other type of sales display, (2) the amount of time shoppers remain adjacent to the end cap or sales display, and (3) which products, if any, shoppers are scanned from the end cap, placed into their shopping carts and purchased. Such an ability provided by the innovative systems herein, therefore, provides insight into actual shopper behavior prior to and at the point of product selection, such behavior being known by those in retail as the first moment of truth. Monitoring and cataloging such actual shopper behavior in real time is a sea change in the nature of such shopper evaluation and analysis. This change is powered by the ability of the inventions herein.

Figure 6B:
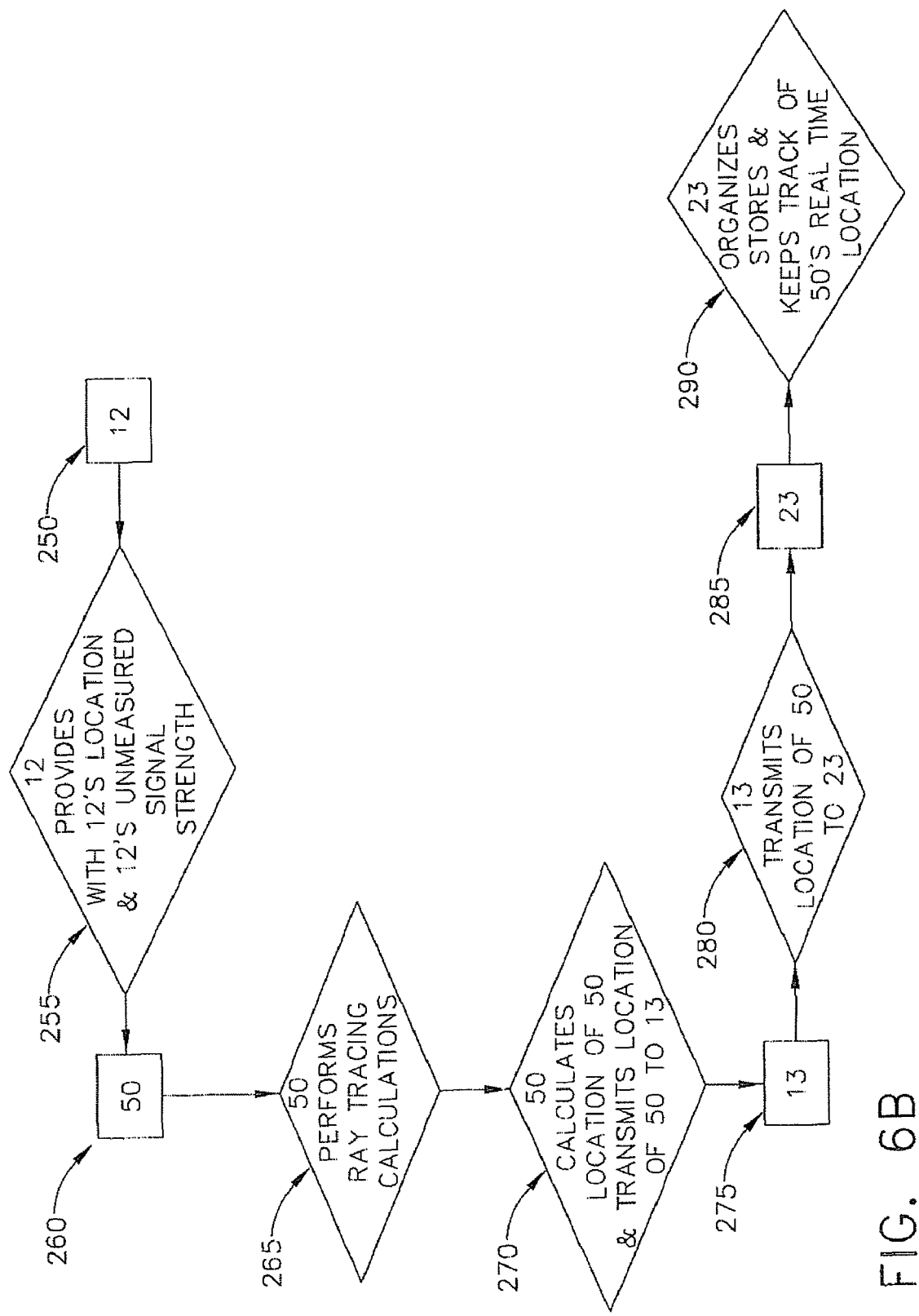

FIG. 6B provides a flowchart of an alternative exemplary embodiment of the system shown in FIG. 6A, wherein instead of a non-beaconing system, the system acts as a beaconing system. In FIG. 6B the blind node 50 is automatically updated with the location of the closest information routers 12 of the one or more mesh communication networks 14. In steps 250 and 255 each information router 12 provides its location in a signal with an unmeasured signal strength to the blind nodes 50 (step 260). Herein, the blind node 50 does not send out a request for a signal from the information router 12, as it does in FIG. 6A. Herein each information routers 12 provides its X and Y positional coordinates a predetermined number of times per period of time to the closest blind nodes 50 in the one or more mesh communication networks 14.

Apart from the initial steps of the flowchart, steps 250 through 260 which are described above, the rest of the steps, steps 265 through 290, are the same as steps 220 through 245 of FIG. 6A.

Figure 6C:
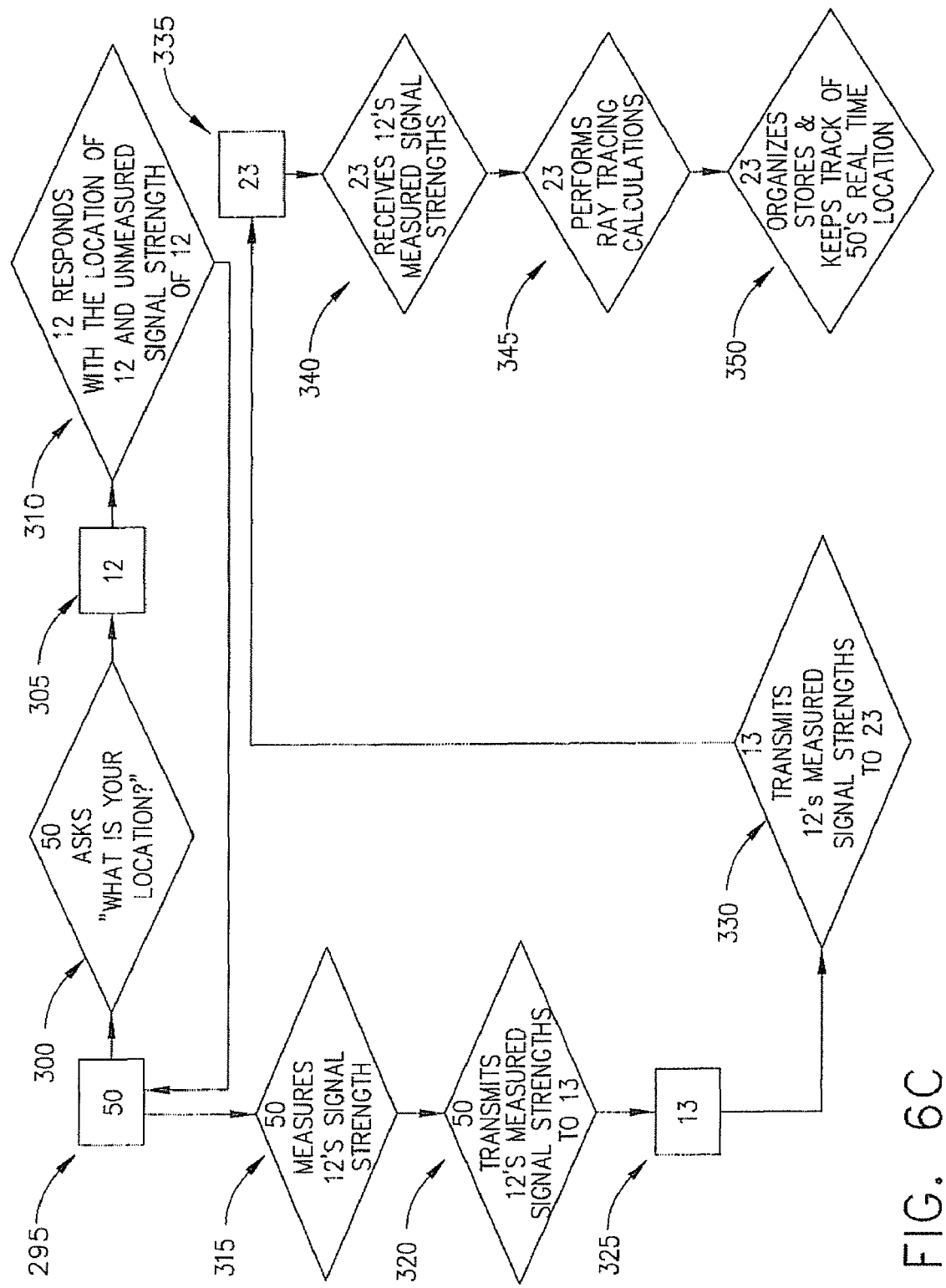

FIG. 6C provides a flowchart of an alternative embodiment of the one or more systems for calculating, storing and keeping track of the location of the presumed location of an operator within store. The first steps 295, 300, 305 and 310, are the same as those of step 200 through step 215 of FIG. 6A. In both FIG. 6A and in FIG. 6C, in steps 220 and 315, respectively, the blind node 50 measures the strength of the signals received from the information routers 12 available through the communication multi-network. In FIG. 6A, the blind node 50 conducts the ray tracing calculations, thus, calculating its own X and Y positional coordinates within the store. In contrast to FIG. 6A, FIG. 6C provides in step 320 that the blind node transmits the measured signal strengths received from the information routers 12 through the mesh communication lines 17 to the mesh network organizer 13 (shown in step 325). In step 330, the measured signal strengths are transmitted through the system communication lines 19 to the one or more logic engines 23 (shown in step 335).

Then, in step 340, the one or more logic engines 23 receive the measured signal strengths. In step 345, one or more logic engines 23 perform ray tracing calculations as previously described above to determine the X and Y positional coordinates of the blind node 50. At this point, the blind node 50 is no longer blind to the store. Finally in step 350, the one or more logic engines 23 organize, store and keep track of the real time location of the location tracking device associated with the blind node 50.

Figure 6D:
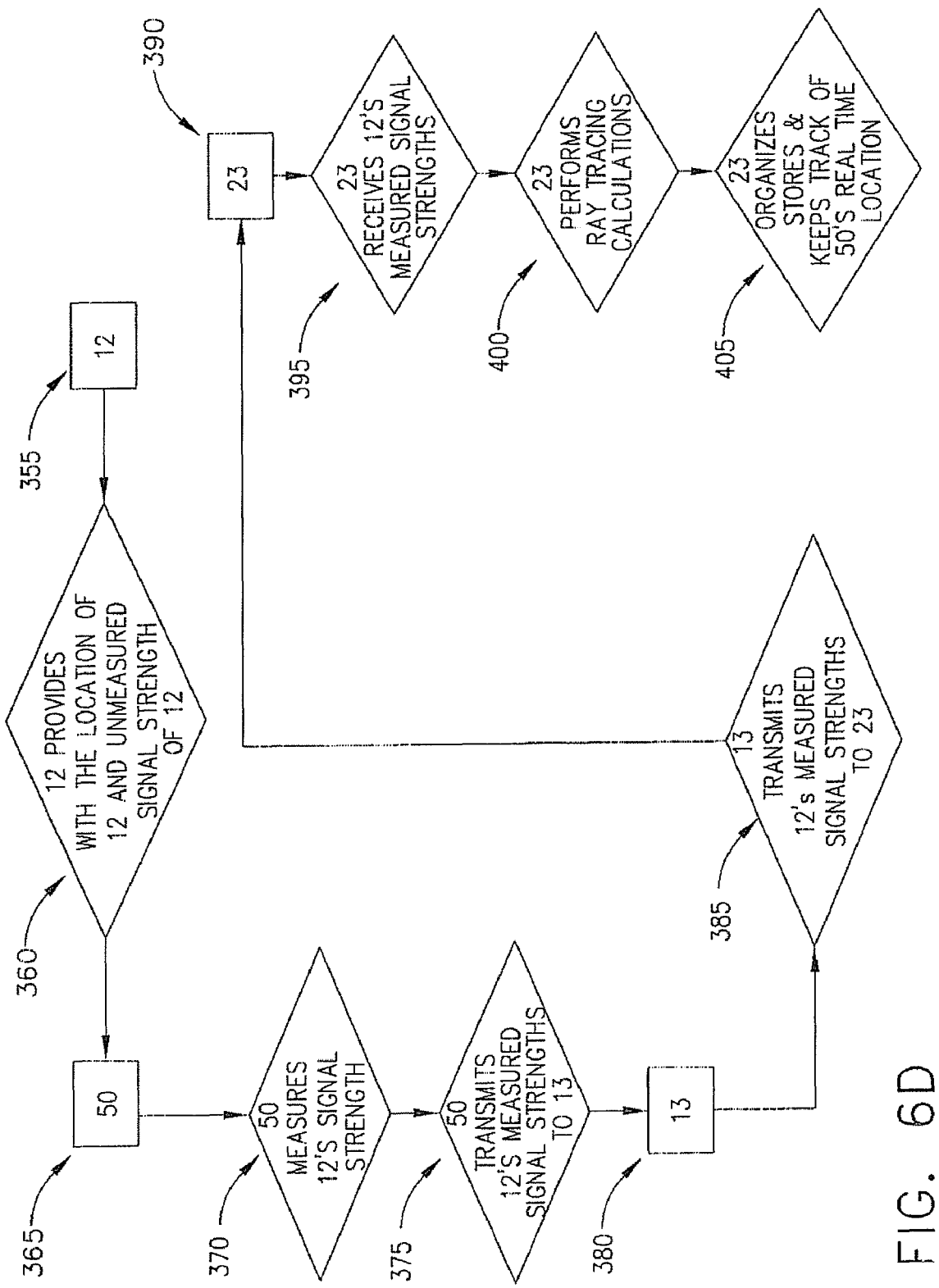

FIG. 6D shows an exemplary embodiment of the one or more systems of calculating, storing and keeping track of the location of the presumed location of the operator within the store; wherein substantially all electronic communication takes place through the one or more mesh communication networks 14. In the embodiment shown in FIG. 6D, the initial steps of FIG. 6B, steps 250 through step 260, are followed exactly in FIG. 6D steps 355 through step 365.

Then, steps 315 through step 350 of FIG. 6C, as previously described, are followed in this FIG. 6D in steps 370 through step 405. In step 370 of FIG. 6D, the blind node 50 shown in step 365 measures the strength of the signals received from the information routers 12 available through the communication multi-network. In FIG. 6D in step 375, the blind node transmits the measured signal strengths received from the information routers 12 through the mesh communication lines 17 to the mesh network organizer 13, which is shown in step 380. In step 385, the measured signal strengths are transmitted through the system communication lines 19 to the one or more logic engines 23, shown in shown in step 390.

Then, in step 395, the one or more logic engines 23 receive the measured signal strengths. In step 400, one or more logic engines 23 perform ray tracing calculations as previously described above to determine the X and Y positional coordinates of the blind node 50. At this point, the blind node 50 is no longer blind to the store. Finally, in step 405, the one or more logic engines 23 organize, store and keep track of the real time location of the location tracking device associated with the blind node 50.

FIG. 7A through FIG. 7D provide flowcharts of alternative embodiments of the system for calculating, storing and keeping track of the location of the presumed location of the operator within the store; wherein substantially all electronic communication takes place through the one or more mesh communication networks 14 and the one or more star communication networks 16.

Figure 7A:
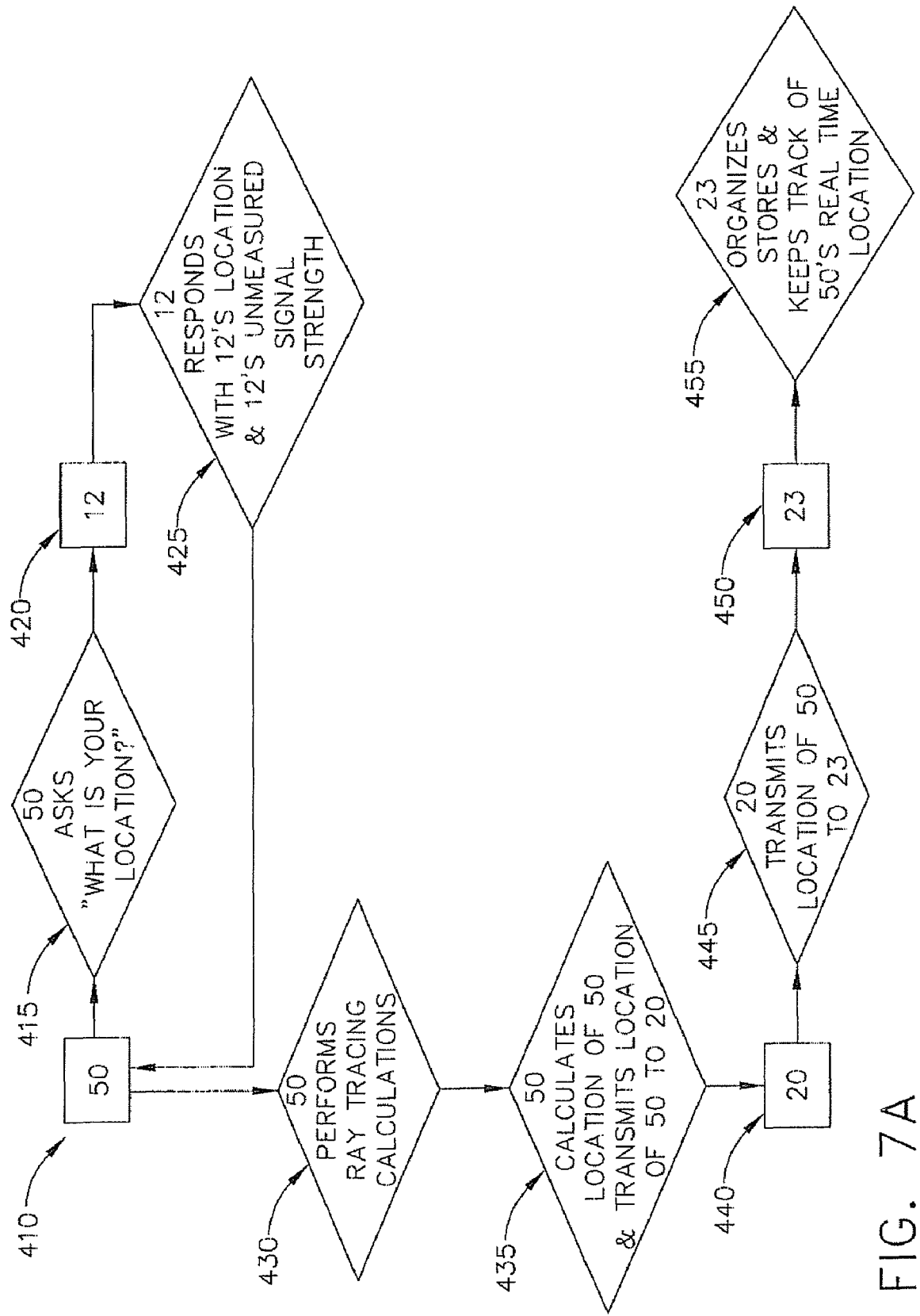
FIG. 7A, FIG. 7B, FIG. 7C and FIG. 7D provide flowcharts of exemplary embodiments of a system for calculating, storing and keeping track of the location of the presumed location of an operator within the store wherein communication from the tracking device to the one or more logic engines take place over the star communication network.

In FIG. 7A, the flowchart begins with step 410, blind node 50. In step 415, blind node 50 asks the question, "what is your location?" of the information routers 12 (shown in step 420). A person with ordinary skill in the art will appreciate that other questions or signals could be used to acquire the location data pertaining to each information router 12.

The information router 12, answers the question in step 425 to establish the location of the blind node 50 within store. When the closest information routers 12 receive the signal asking the question, they transmit signals back to the blind node 50. When the blind node 50 receives the signal from each information routers 12 that is closest to the blind node 50, the blind node 50 receives two pieces of information: (1) the X and Y positional coordinates of each information router 12 that responded and (2) the attendant signal strength of each information router 12 that responded.

Next, in a step not shown, the blind node 50 measures the attendant signal strength received from the closest information router 12. In step 430, with the signal strengths of each received signal measured and thereby known by the blind node 50, blind node 50 preferably uses ray tracing calculations with the attendant signal strengths as inputs to calculate its position with respect to the information routers 12. The output of such calculations is the location, presented in the X and Y positional coordinates of the blind node 50. Thus, as shown in step 435 of FIG. 6, the blind node 50 calculates its position along the X and Y positional coordinate system of store.

As shown in step 435, once calculated, the blind node 50 transmits its X and Y coordinates through the one or more star communication networks 16 to the data communication radio 20 (shown in step 440). Then, in step 445, the data communication radio 20 transmits the X and Y positional coordinates of the blind node 50 to either the one or more logic engines 23 (shown in step 450 of FIG. 7A) or the location tracking server 31 (not shown). As depicted in step 455, the one or more logic engines 23 organize, store and then keep track of the various locations of the blind node 50 as the operator moves it throughout the store.

Figure 7B:
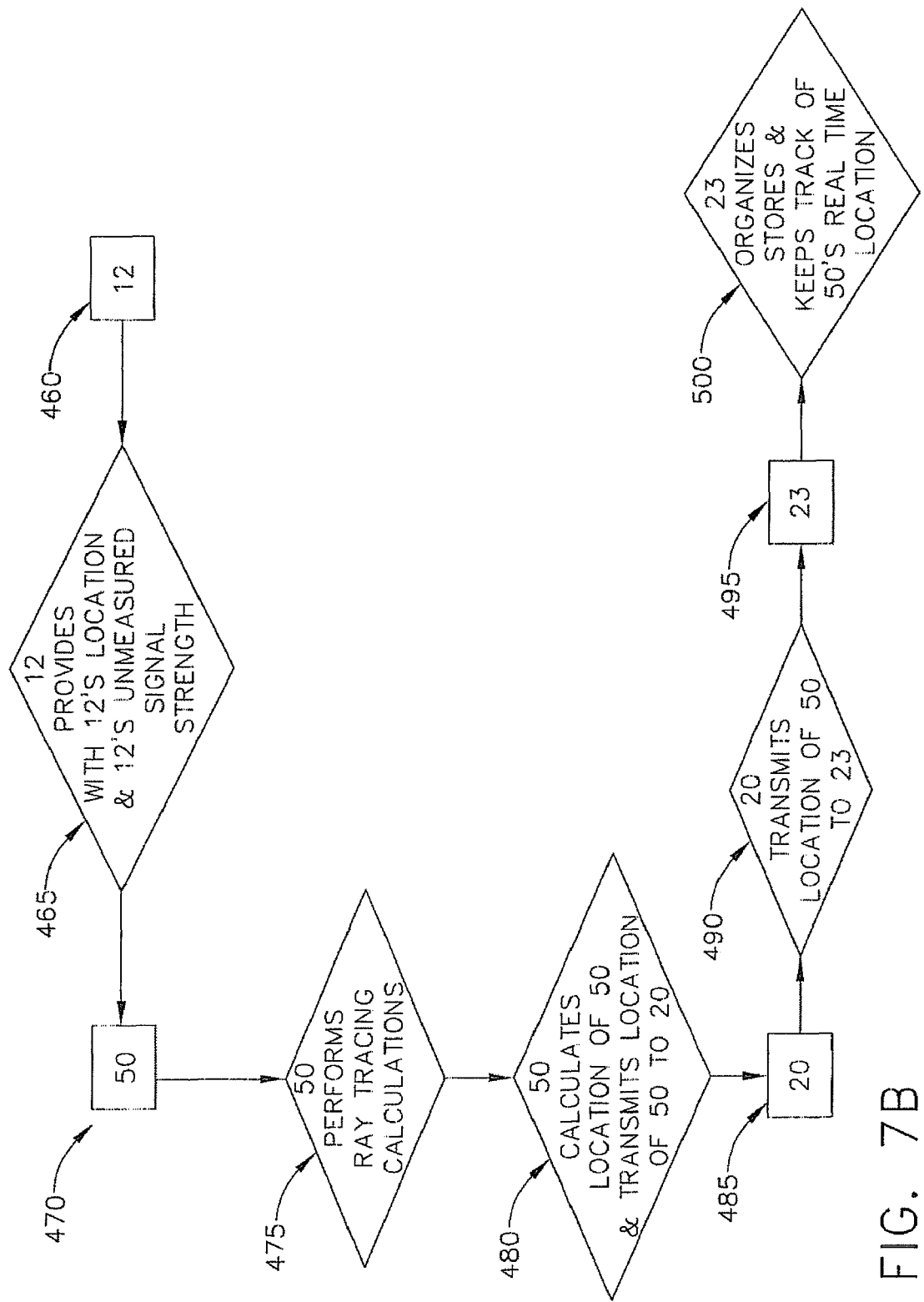

FIG. 7B provides a flowchart of an alternative embodiment of the system shown in FIG. 7A, wherein instead of a non-beaconing system, the system acts as a beaconing system. In FIG. 7B, the blind node 50, shown in step 470, is automatically updated with the location of the closest information routers 12, shown in step 460, of the one or more mesh communication networks 14. In steps 465, information routers 12 provide the location of information router 12 in a signal with an unmeasured signal strength to the blind nodes 50. Herein, the blind node 50 does not send out a request for a signal from the information routers 12, as it does in FIG. 7A. Herein each information routers 12 provides its location a certain number of times per minute to the closest blind nodes 50 in the one or more mesh communication networks 14. For example, each information router 12 provides the location information of itself to the blind nodes 50 through the one or more mesh communication networks 14 ten times per second. The blind node 50 will be aware of the location of the information routers 12 any time the blind node 50 is listening, which could be six times per second.

Apart from the initial steps of the flowchart, steps 460 through 470, which are described above, the rest of the steps, steps 475 through 500, are the same as steps 430 through 455 of FIG. 7A. In FIG. 7B, as shown in step 485, once calculated, the blind node 50 transmits its X and Y coordinates through the one or more star communication networks 16 to the data communication radio 20 (shown in step 485). Then, in step 490, the data communication radio 20 transmits the X and Y positional coordinates of the blind node 50 to either the one or more logic engines 23, shown in step 495, or the location tracking server 31 (not shown). As depicted in step 500, the one or more logic engines 23 organize, store and then keep track of the various locations of the blind node 50 as the operator moves it throughout the store.

Figure 7C:
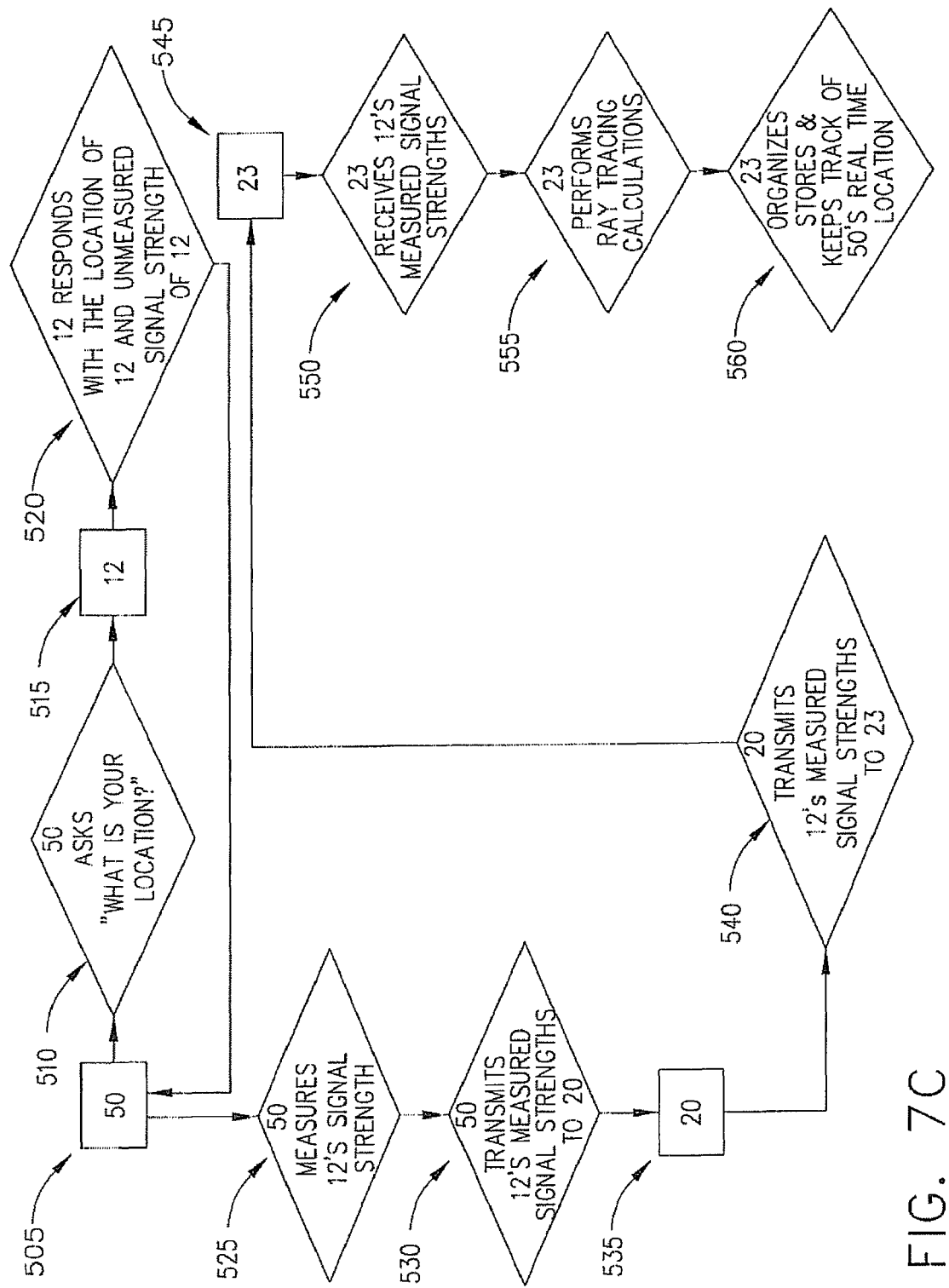

FIG. 7C provides a flowchart of an alternative embodiment of the one or more systems for calculating, storing and keeping track of the location of the presumed location of the operator within the store. The first steps 505 through 520 are the same as those of step 410 through step 425 of FIG. 7A. The flowchart in FIG. 7C begins with step 505, blind node 50. In step 510, blind node 50 asks the question, "what is your location?" of the information routers 12 (shown in step 515). A person with ordinary skill in the art will appreciate that other questions or signals could be used to acquire the location data pertaining to each information router 12.

The information router 12, answers the question in step 520 to establish the location of the blind node 50 within store. When the closest information routers 12 receive the signal asking the question, they transmit signals back to the blind node 50. When the blind node 50 receives the signal from each information routers 12 that is closest to the blind node 50, the blind node 50 receives two pieces of information: (1) the X and Y positional coordinates of each information router 12 that responded and (2) the attendant signal strength of each information router 12 that responded.

In both FIG. 7A and in FIG. 7C, the blind node 50 measures the strength of the signals received from the information routers 12 in steps 430 and 525, respectively. In FIG. 7A, the blind node 50 conducts the ray tracing calculations thus calculating its own X and Y positional coordinates within the store. In contrast to FIG. 7A, FIG. 7C provides in step 530, that the blind node 50 transmits the measured signal strengths received from the information routers 12 through the star communication lines 18 to the data communication radio 20 (shown in step 535). In step 540, the measured signal strengths are transmitted through the system communication lines 19 to the one or more logic engines 23 (shown in step 545).

Then, in step 550, the one or more logic engines 23 receive the measured signal strengths. In step 555, the one or more logic engines 23 performs ray tracing calculations as previously described above to determine the X and Y positional coordinates of blind node 50. At this point, the blind node 50 is no longer blind to the store. Finally, in step 560, the one or more logic engines 23 organize, store and keep track of real time location of the location tracking device associated with the blind node 50.

Figure 7D:
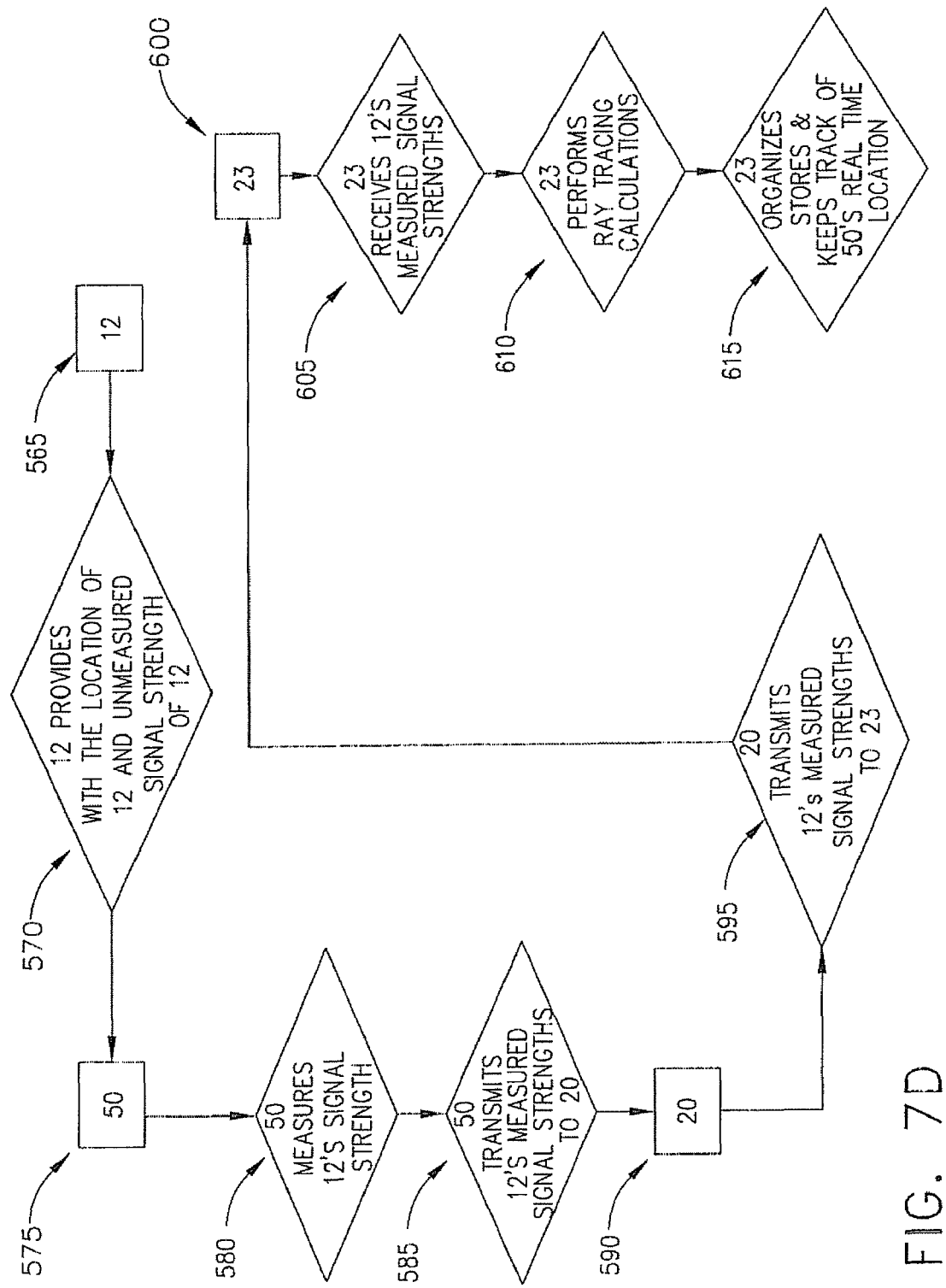

FIG. 7D depicts an alternative exemplary embodiment of the one or more systems for calculating, storing and keeping track of the location of the presumed location of the operator within the store. The initial steps of FIG. 7B, steps 460 through step 470, are followed exactly in FIG. 7D steps 565 through step 575.

In FIG. 7D, the blind node 50, shown in step 575, is automatically updated with the location of the closest information routers 12, shown in step 565, of the one or more mesh communication networks 14. In steps 570, information routers 12 provide the location of information router 12 in a signal with an unmeasured signal strength to the blind nodes 50. Herein, the blind node 50 does not send out a request for a signal from the information routers 12, as it does in FIG. 7A. Herein each information router 12 provides its location a certain number of times per minute to the closest blind nodes 50 in the one or more mesh communication networks 14. For example, each information router 12 provides the location information of itself to the blind nodes 50 through the one or more mesh communication networks 14 ten times per second. The blind node 50 will be aware of the location of the information routers 12 any time the blind node 50 is listening, which could be, for example, six times per second.

Then, steps 525 through step 560 of FIG. 7C, as previously described, are followed in this FIG. 7D in steps 580 through step 615. In FIG. 7D provides in step 585, that the blind node 50 transmits the measured signal strengths received from the information routers 12 through the star communication lines 18 to the data communication radio 20 (shown in step 590). In step 595, the measured signal strengths are transmitted through the system communication lines 19 to the one or more logic engines 23 (shown in step 600).

Then, in step 605, the one or more logic engines 23 receive the measured signal strengths. In step 610, the one or more logic engines 23 performs ray tracing calculations as previously described above to determine the X and Y positional coordinates of blind node 50. At this point, the blind node 50 is no longer blind to the store. Finally, in step 615, the one or more logic engines 23 organize, store and keep track of real time location of the location tracking device associated with the blind node 50.

Figure 8:
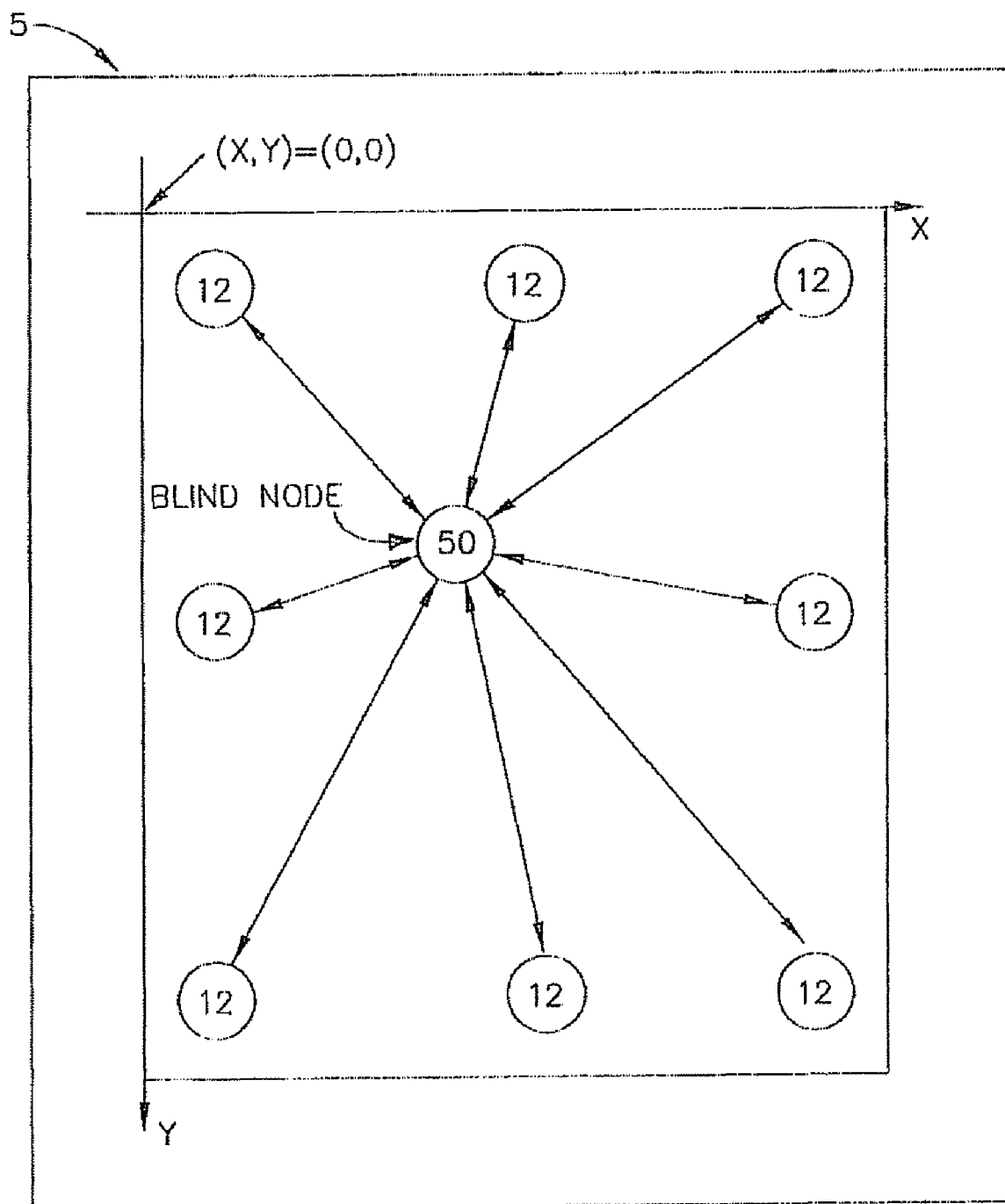
FIG. 8 provides an exemplary embodiment of a simplified system for location detection.

FIG. 8 provides a simplified system for location detection wherein the X and Y two dimensional grid is superimposed onto the schematic view of the store, which is used by the disclosed systems and methods to locate operators and things within the store. In all the figures, X is defined to be the horizontal direction and Y the vertical. Every two dimensional grid needs a point named (X, Y)=(0, 0). In FIG. 8, the point named (X,Y)=(0, 0) is located in the upper left corner of the grid. The two dimensional grid superimposed onto a map of store is known to the one or more logic engines 23.

Though not shown, a third dimension, Z, is also herein contemplated. An example of the use of the third dimension, Z, is to location objects on different floors of a building, or the location of produce on shelves. Thus for every reference herein to X and Y positional coordinates, it is also meant to include X, Y and Z positional coordinates.

Each information router 12 is configured with X and Y positional coordinates of the store's grid that corresponds with the physical location of each information router 12. Each information router 12 is aware of its X and Y positional coordinates. The main task for the information routers 12 is to provide a "reference" packet that contains the X and Y positional coordinates corresponding with the locations of the respective information router 12 to the blind nodes 50.

The blind nodes 50 communicate with the closest information router 12, collecting X and Y coordinates, and the RSSI (i.e., signal strength data) for each of the information routers. Then each blind nodes 50 calculates its X and Y coordinates based on the parameter input using location engine software. Soon thereafter, its calculated position is sent to a control station, the one or more logic engines 23 or the location tracking server. When the blind node 50 herein receives a received data packet containing the X and Y positional coordinates of the information router 12, the blind node automatically adds an assigned RSSI value to the received data packet. Preferably, the assigned RSSI value is averaged over the 8 first symbol periods (128 ps). The assigned RSSI value is represented as a one byte value, as a signed 2's complement value. In exemplary embodiments, when the received data packet is read from the FIFO on the CC2431, the second last byte contains the RSSI value that was measured after receiving 8 symbols of the actual packet. Even when the RSSI value is captured at the same time as the data packet is received, the RSSI value reflects the intensity of the received signal strength at that time or possibly also the signal power belonging to the received packet data.

In exemplary embodiments, the blind node 50 contains a register of termed RSSI. The register of termed RSSI holds the same values as described above, but it is not locked when a received data packet is received, hence the register value is not be used for further calculations. Only the locked RSSI value attached to the received packet data is interpreted as the RSSI value measured exactly when the data is received.

The received signal strength is a function of the transmitted power and the distance between the sender and the receiver. In exemplary embodiments of the systems, the received signal strength decreases with increased distance as the equation below shows:

$$(lolog)10RSSI=-nd+A$$

Wherein, n is a signal propagation constant, also named propagation exponent; d is a distance from sender; and A is a received signal strength at a distance of one meter.

While various exemplary embodiments of the present invention have been described above, it should be understood that they have been presented by way of example, and not limitation. It will be apparent to persons skilled in the relevant art(s) that various changes in form and detail can be made therein without departing from the spirit and scope of embodiments of the present invention. Thus, embodiments of the present invention should not be limited by any of the above described exemplary embodiments, but should be defined only in accordance with the following claims and their equivalents.

What is claimed is:

1. A system for locating a presumed position of an operator in a store, comprising:

A map of said store;

An X and Y two-dimensional grid superimposed over said map of said store;

A set of X and Y positional coordinates that correspond with each said presumed position of said operator on said X and Y two-dimensional grid superimposed over said map of said store;

At least one location tracking device positioned in a proximate position to said operator that operates to calculate X and Y positional coordinates data;

At least one logic engine that organizes and stores said X and Y positional coordinates data; and A communication multi-network for communication about said store, the communication multi-network comprising At least one star communication network through which non-location data is transferred to said at least one logic engine; and At least one mesh communication network through which said at least one location tracking device is tracked throughout said store based on said X and Y positional coordinates data;

Whereby said at least one logic engine is operatively connected to said communication multi-network; whereby said at least one location tracking device is operatively connected to said communication multi-network and communicates through said communication multi-network to said at least one logic engine; whereby each said at least one location tracking device operates as a blind node within said communication multi-network.

2. The system of claim 1 wherein said operator is selected from the group consisting of a shopper, an associate, a manager, or a vendor.

3. The system of claim 1 wherein said at least one location tracking device is positioned within a wireless end device.

4. The system of claim 1 wherein said at least one location tracking device is attached to a shopping cart.

5. The system of claim 1 wherein said at least one location tracking device is attached to a shopping basket.

6. The system of claim 1 wherein said at least one logic engine generates a historical progression of substantially all of the presumed positions of the operator as the operator operates throughout the store.

7. The system of claim 1 wherein each said at least one location tracking device represents said set of X and Y positional coordinates in said store.

8. The system of claim 1 wherein said communication multi-network comprises at least two information routers having a range of transmission of signal data, said at least two information routers being positioned about said store whereby said at least two information routers operate to receive and transmit said signal data throughout said communications multi-network.

9. The system of claim 8 whereby each said at least one location tracking device transmits and receives said signal data from said at least two information routers thereby communicating within said communication multi-network in said store.

10. The system of claim 8 wherein said at least two information routers are positioned about said store each said at least two information routers having a fixed position and a known set of X and Y positional coordinates that relate to the X and Y two-dimensional grid superimposed over said map of said store.

11. The system of claim 10 wherein said fixed position and said known set of X and Y positional coordinates of said store of each said at least two information routers are substantially transmitted in a continuous fashion through said signal data to each said at least one location tracking device within said range of transmission of each said at least two information routers, said signal data having a received signal strength whereby said received signal strength is contingent upon the proximity of each said at least one location tracking device to each said at least two information routers.

12. The system of claim 11 wherein said one or more logic engines calculate a calculated position, the set of X and Y positional coordinates that correspond with each said presumed position of said operator in said store, by measuring said received signal strength of each said received signal data from each said at least two information routers in range of each said at least one location tracking device.

13. The system of claim 11 wherein each said at least one location tracking device calculates a calculated position, which is the set of X and Y positional coordinates that correspond with each said presumed position of said operator in said store, by measuring said received signal strength of each said received signal data from each said at least two information router in range of each said location tracking device.

14. The system of claim 13 wherein each said at least one location tracking device transmits its said calculated position to said at least one logic engine through said communication multi-network.

15. The system of claim 14 wherein said at least one logic engine retains in memory each of the calculated positions of each said at least one location tracking device transmitting each said calculated position to said at least one logic engine creating an historical progression of each said presumed position of each said operator operating in said store with said at least one logic engine.

16. The system of claim 1 wherein said at least one logic engine device calculates the proximity of said at least one location tracking device to at least two information routers that provide a signal to said at least one location tracking device by using ray tracing calculations, whereby said at least one logic engine device creates location tracking information.

17. The system of claim 16 wherein said at least one logic engine operates to manage, organize and route location tracking information.

18. The system of claim 1 wherein said at least one mesh communication network operates within a 802.15 standard.

* * * * *

UNITED STATES PATENT AND TRADEMARK OFFICE
CERTIFICATE OF CORRECTION

| | | |
|---|---|---|
| PATENT NO. | : 7,734,513 B2 | Page 1 of 1 |
| APPLICATION NO. | : 12/353817 | |
| DATED | : June 8, 2010 | |
| INVENTOR(S) | : Bonner et al. | |

It is certified that error appears in the above-identified patent and that said Letters Patent is hereby corrected as shown below:

In the Specification:

Column 13, lines 29-30, delete "information routers 12" and insert therefor -- wireless end devices 40 --;

Column 13, line 32, delete "blind nodes." and insert therefor -- information routers.--;

Column 13, line 33, delete "and the information routers";

Column 13, line 37, delete "information routers" and insert therefor -- blind nodes --; and Column 13, line 40, delete "information routers" and insert therefor -- blind nodes --.

Signed and Sealed this

Sixteenth Day of November, 2010

David J. Kappos
*Director of the United States Patent and Trademark Office*